United States Patent
Felisari et al.

(10) Patent No.: US 8,969,466 B2
(45) Date of Patent: *Mar. 3, 2015

(54) EXPANDABLE THERMOPLASTIC NANOCOMPOSITE POLYMERIC COMPOSITIONS WITH AN IMPROVED THERMAL INSULATION CAPACITY

(75) Inventors: Riccardo Felisari, San Giorgio di Mantova (IT); Olga Valentino, Mantova (IT); Alessandro Casalini, Mantova (IL)

(73) Assignee: versalis S.p.A., San Donato Milanese (IT)

( * ) Notice: Subject to any disclaimer, the term of this patent is extended or adjusted under 35 U.S.C. 154(b) by 342 days.

This patent is subject to a terminal disclaimer.

(21) Appl. No.: 13/500,763

(22) PCT Filed: Oct. 6, 2010

(86) PCT No.: PCT/IB2010/002547
§ 371 (c)(1),
(2), (4) Date: Jul. 2, 2012

(87) PCT Pub. No.: WO2011/042800
PCT Pub. Date: Apr. 14, 2011

(65) Prior Publication Data
US 2012/0264836 A1 Oct. 18, 2012

(30) Foreign Application Priority Data
Oct. 7, 2009 (IT) .............................. MI2009A1715

(51) Int. Cl.
*C08K 3/04* (2006.01)
*C08J 9/16* (2006.01)
*C08J 9/00* (2006.01)

(52) U.S. Cl.
CPC .............. *C08J 9/0066* (2013.01); *C08J 9/0071* (2013.01); *C08J 2325/06* (2013.01)
USPC ................. 524/496; 524/495; 524/1; 521/56; 521/59; 521/60; 521/79

(58) Field of Classification Search
USPC ............... 521/60, 56, 59, 79; 524/1, 495, 496
See application file for complete search history.

(56) References Cited

U.S. PATENT DOCUMENTS

| | | |
|---|---|---|
| 2006/0148916 A1 | 7/2006 | Loh et al. |
| 2008/0300331 A1 | 12/2008 | Schellenberg et al. |
| 2010/0096597 A1 | 4/2010 | Prud'Homme et al. |
| 2011/0284793 A1* | 11/2011 | Ponticiello et al. ............. 252/62 |
| 2012/0065311 A1* | 3/2012 | Chakraborty et al. ........ 524/364 |
| 2012/0195004 A1* | 8/2012 | Miller ........................... 361/705 |

FOREIGN PATENT DOCUMENTS

| WO | 2008 045778 | 4/2008 |
|---|---|---|
| WO | 2008 091308 | 7/2008 |

OTHER PUBLICATIONS

Data Sheet for Graphene Nanoplatelets. ACS. 2014.*
Verdejo, R., et al., "Functionalized graphene sheet filled silicone foam nanocomposites," Journal of Materials Chemistry, vol. 18, pp. 2221-2226, (Mar. 19, 2008).
International Search Report Issued Jan. 26, 2011 in PCT/IB10/02547 Filed Oct. 6, 2010.

* cited by examiner

*Primary Examiner* — Kara Boyle
(74) *Attorney, Agent, or Firm* — Oblon, McClelland, Maier & Neustadt, L.L.P.

(57) ABSTRACT

Nanocomposite compositions based on expandable thermoplastic polymers which comprise: a) a polymeric matrix produced by the polymerization of a base comprising one or more polymerizable monomers; b) 1-10% by weight, calculated with respect to the polymer (a), of an expanding agent englobed in the polymeric matrix; c) 0.004-15% by weight, calculated with respect to the polymer (a), of an athermanous filler comprising nano-scaled graphene plates with a thickness (orthogonal to the graphene sheet) not greater than 150 nm, an average dimension (length, width, or diameter) not greater than 10 micrometers and a surface area>50 m2/g.

36 Claims, No Drawings

EXPANDABLE THERMOPLASTIC NANOCOMPOSITE POLYMERIC COMPOSITIONS WITH AN IMPROVED THERMAL INSULATION CAPACITY

FIELD OF THE INVENTION

The present invention relates to nanocomposite compositions, based on expandable thermoplastic polymers filled with nano-scaled graphene plates, suitable for the preparation of expanded articles with an improved thermal insulation capacity, the process for their preparation and the expanded articles obtained therefrom.

More specifically, the present invention relates to granules/beads based on expandable thermoplastic vinyl aromatic polymers, for example expandable polymers of styrene, filled with nano-scaled graphene plates, which, after expansion, have a reduced thermal conductivity even with a low density, lower than 20 g/l, for example, and the expanded products obtained from the same i.e. the extruded expanded sheets obtained starting from said vinyl aromatic compositions. The present invention, as described hereunder, can also be applied to expandable thermoplastic vinyl polymers, for example polyethylene, as also illustrated and claimed.

BACKGROUND OF THE INVENTION

Expandable thermoplastic polymers and among these, in particular, expandable polystyrene (EPS), are products which have been known and used for a long time for preparing expanded articles which can be adopted in various applicative areas, among which, one of the most important is thermal insulation.

These expanded products are obtained by first swelling the polymer granules, in a closed environment, impregnated with an expandable fluid, for example an aliphatic hydrocarbon such as pentane or hexane, and then molding/sintering the swollen particles, charged inside a mould, by the contemporaneous effect of pressure and temperature. The swelling of the particles, as also their sintering, is generally effected with vapour, or another gas, maintained at a temperature slightly higher than the glass transition temperature (Tg) of the polymer.

A particular applicative field, for example of expanded polystyrene, is that of thermal insulation in the building industry where it is generally used in the form of flat sheets. The flat sheets of expanded polystyrene are normally used with a density of about 30 g/l as the thermal conductivity of the polymer has a minimum at these values. It is not advantageous to fall below this limit, even if this is technically possible, as it causes a drastic increase in the thermal conductivity of the sheet which must be compensated by an increase in its thickness. In order to avoid this drawback, suggestions have been made to fill the polymer with athermanous materials such as graphite, carbon black or aluminium. Athermanous materials are in fact capable of interacting with the radioactive flow (infrared radiation), reducing its transmission and thus increasing the thermal insulation of the expanded materials in which they are contained.

The best performances of thermal insulation allow a significant reduction in the density of the expanded article or thickness of the same without reducing the overall thermal resistance value.

European patent 620,246, for example, describes a process for preparing granules of expandable polystyrene containing an athermanous material, for example carbon black, distributed on the surface or, alternatively, incorporated inside the particle itself.

The use of carbon black has long been known as a filler or pigment, or else as a nucleating agent (see, for example, Chem. Abstr., 1987, "Carbon Black Containing Polystyrene Beads").

Among the various types of carbon black, the most important are carbon black from oil combustion ("petroleum black"), carbon black from gas combustion, carbon black from acetylene, lamp black, channel black, thermal black and electrically conductive carbon black. International patent application WO 1997/45477 describes compositions based on expandable polystyrene comprising a styrene polymer, from 0.05 to 25% of carbon black of the lamp black type, and from 0.6 to 5% of a brominated additive to make the product fireproof.

Depending on the manufacturing process, these carbon blacks have diameters which range from 10 nm to 1,000 nm approximately, and have very different specific surfaces (from 10 to 2,000 $m^2/g$). These differences lead to different blockage capacities of the infrared rays. International patent application WO 2006/61571 describes compositions based on expandable polystyrene comprising a styrene polymer having a weight average molecular weight Mw of 150,000-450,000, from 2 to 20% by weight of an expanding agent and from 0.05 to less than 1% of carbon black, with a surface area ranging from 550 to 1,600 $m^2/g$.

It is known that graphite can also be effectively used as a blackbody (as described, for example, in JP 63-183941, WO 04/022636, WO 96/34039). Its use as attenuating agent of infrared radiation in polymeric foams is, however, more recent. Patent application JP 63-183941 is among the first to propose the use of some additives, active in blocking infrared rays in wavelengths ranging from 6 to 14 microns, and therefore obtaining thermally insulating thermoplastic resins capable of permanently sustaining a low thermal conductivity. Among all additives, graphite is preferred.

Patent DE 9305431U describes a method for producing expanded moulded products having a density of less than 20 $kg/m^3$ and a reduced thermal conductivity. This result is reached by incorporating an athermanous material, such as graphite and also carbon black, in the rigid polystyrene foam.

International patent application WO 98/51735 describes expandable polystyrene particulates containing 0.05 to 25% by weight of synthetic or natural graphite particles, homogeneously distributed in the polystyrene matrix. The graphite preferably has an average diameter ranging from 1 to 50 μm, an apparent density ranging from 100 to 500 g/l and a surface area ranging from 5 to 20 $m^2/g$.

DESCRIPTION OF THE INVENTION

The Applicant has now found that it is possible to prepare a composition based on expandable vinyl or vinyl aromatic polymers with enhanced thermoinsulating properties, using nano-scaled graphene plates as athermanous agent.

It has been found that the foams obtained from said expandable composites show, with the same density obtained, an improved thermal insulation if compared with the foams of polymers not containing said nano-scaled plates. The thermal insulation capacity is surprisingly generally better than the foams obtained using other athermanous agents such as, for example, coal, graphite and aluminum flakes. This is even more surprising considering that nano-scaled graphene plates on compact polymers confer a high thermal conductivity (see for example Wang et al, "Thermal Expansion of Graphene Composites", Macromolecules), consequently an expert in the field would be induced to considering them unsuitable for improving the thermal insulation, for example, of EPS.

It has also been found that in these innovative nanocomposite foams, it is possible to confer flame retardant characteristics with a reduced concentration of traditional flame-retardant additives, such as halogen-derivatives.

Nano-scaled graphene plates have recently aroused great interest in the scientific field as they have been found to be an effective and more economical alternative to carbon nanotubes.

Carbon nanotubes (CNT) are nano-materials on a graphite base which, thanks to the high aspect ratio (L/D) and exceptional electric, mechanical and other properties, are widely applied in the field of polymeric nanocomposites.

International patent application WO 2008/091308, for example, describes electrically conductive thermoplastic polymeric foams based on MWNT (Multi Walled Nano Tube), used in a concentration ranging from 0.05% to 1% by weight.

International patent application WO 2006/114495 describes polymeric foams (thermoplastic and thermosetting) with cell dimensions<150 µm, based on nanotubes in a concentration lower than 60% by weight. These foams are used in the field of food packaging, thermal insulation, membranes, etc.

Patent application WO 03/085681 relates to polymeric foams, filled with carbon nanotubes, having a volumetric resistivity ranging from $10^{-3}$ ohm-cm to $10^8$ ohm-cm.

CNTs are generally divided into two main groups: single wall nanotubes (SWNT) and multiple wall nanotubes (MWNT). An ideal SWNT can be described as a rolled up graphene sheet forming a tubular structure closed at the ends by two semi-fullerenes. SWNTs typically have diameters of 1-10 nm and lengths in the order of microns from which there is an L/D aspect ratio>1000. Depending on the rolling direction of the graphene sheet, it is possible to distinguish chiral (helicoidal) and non-chiral structures.

Studies on the electric properties of SWNTs have shown that, in relation to the diameter and chirality, these can have both a metallic and semiconductor behaviour.

MWNTs, described as concentric graphene tubes connected by weak Van der Walls forces, typically have electronic properties similar to SWNTs.

The nano-scaled graphene plates, to which the present invention refers, are different from carbon nanotubes. These nano-scaled graphene plates consist of one or more graphene sheets. Graphene is a bidimensional hexagonal lattice of carbon atoms. The graphene sheets can be at least partially superimposed with respect to each other, in this way forming nano-scaled graphene plates.

These graphene sheets can possibly be functionalized or chemically modified. This functionalizations or modifications can impart a different interplanar distance, generally greater, with respect to that obtained by the superimposing of pure graphene.

In particular, the nano-scaled graphene plates to which the present invention refers have a thickness (orthogonal to the graphene sheet) not greater than 150 nm. The thickness is preferably lower than 50 nm, even more preferably the thickness ranges from 0.3 to 5 nm. Said nano-scaled plates also have an average dimension (length, width, or diameter) not greater than 10 micrometers, preferably not greater than 1 micrometer, even more preferably not greater than 500 nm. The nano-scaled graphene plates to which the present invention refers, have a surface area>50 m$^2$/g. The surface area preferably ranges from 100 to 2,600 m$^2$/g, even more preferably the surface area ranges from 300 to 2,600 m$^2$/g.

It is specified in literature that a single graphene sheet has extremely high Young modules (about 1.1 TPa) (Lee et al, Science, 321, 385-388, 2008) and semiconductor electronic properties with zero gaps.

In particular, studies carried out on a single graphene sheet (R. R. Nair et al, "Universal Dynamic Conductivity and Quantized Visible Opacity of Suspended Graphene", Science 320, 1308, 2008) have shown that the latter, in spite of the thickness comparable to the dimensions of an atom (about 0.3 nm), is capable of absorbing 2.3% of the incident light, regardless of the wavelength λ. This indicated a unique electronic structure in graphene: the electrons behave as relativistic fermions (Dirac) without mass, so that the interaction with the light is independent of the crystalline structure.

Numerous studies have been carried out in recent years aimed at optimizing the synthesis processes of these materials. In a first production procedure, said nano-scaled graphene plates are obtained using graphite oxide (GO) as precursor. There are three methods for the oxidation of graphite which are most widely used and described in Brodie B. C., Philos. Trans. R. Soc. London, 149, 249 (1859); Staudenmaier L., Ber. Dtsh. Chem. Ges, 31, 1481 (1898); Hummers W. et al, J. Am. Chem. Soc., 80, 1339 (1958), according to which the oxidation takes place in an acid environment (for example sulfuric acid and nitric acid) in the presence of potassium salts. The graphite oxide produced is subjected to consecutive washing operations in aqueous solution and filtrations, to be finally dried under vacuum.

The graphite oxide obtained according to one of the methods mentioned above is a material consisting of graphite layers intercalated with:
  oxygen groups covalently bound (i.e. epoxy, hydroxyl groups and to a lesser extent carbonyl and carboxylic groups);
  water, non-covalently bound (Stankovich et al, Carbon, 45, 1558-1565 (2007)).

The graphite oxide can be characterized by means of X-ray diffraction (XRD). The XRD spectrum typical of GO generally indicates an interplanar distance of about 0.71 nm (WO 2008/045778) consequently higher than the distance of 0.34 nm typical of pristine graphite.

The functional groups of GO make this material highly hydrophilic and therefore easily exfoliable in aqueous solution. In particular, in patent application WO 2008/048295, sonic waves are used, having a frequency of about 20 kHz, for example, for exfoliating graphite oxide in water, finally obtaining stable colloidal suspensions.

Graphite oxide is generally a material which is electrically insulating and optically very thick, its very hydrophilic nature, moreover, makes it incompatible with the most common organic polymers.

Surprisingly, the Applicant has now found that graphite and/or graphite materials can also be functionalized with oxygen groups through non-conventional physical treatments. According to the present invention, these treatments consist of thermal oxidations in a controlled atmosphere.

A first procedure envisages that the oxidative thermal treatment take place in the presence of oxygen at a variable concentration, preferably with $O_2$ contents ranging from 0.5 to 100% by volume with respect to the total, even more preferably from 1 to 30% by volume with respect to the total. Nitrogen or other inert gases, such as helium or argon, can be used for diluting the oxygen.

More specifically, the oxidation is effected in a furnace consisting of a quartz tube in which the graphite is placed, for times less than 5 hours, preferably from 1 to 3 hours, and at suitable temperatures, preferably lower than 700° C., even more preferably from 350° C. to 600° C.

A certain quantity of water vapour can also be added to the oxidizing atmosphere. The concentration of water vapour can vary from 0.5 to 50% by volume, preferably from 0.5 to 10% by volume, and even more preferably from 0.5 to 5% by volume.

The Applicant has surprisingly found that graphite and/or graphite materials can also be functionalized with oxygen groups by means of ozone or a gas containing ozone. The ozone, to which the present invention refers, can be generated, for example, according to one of the following procedures:

using a gas containing oxygen which is passed through a particular electric discharge (crown effect) which is generated between two electrodes separated by a dielectric material and from the actual discharging area;

using a UV lamp having a wavelength of around 185 nm. A gas containing oxygen, as previously described, is passed around the lamp and the ozone is generated by means of the ultraviolet radiation emitted from the lamp;

using a cold plasma created by a dielectric barrier discharge.

The oxygen content in the gas can be variable. Higher contents generally provide a greater ozone yield. In particular cases, the gas can be air, in which case the oxygen is typically around 20%, or pure oxygen. Water vapour can be added to the gas flow before or after the ozonization.

The functionalization of the graphite material is obtained by fluxing the gas containing ozone onto the graphite material.

The gas containing ozone is passed through the graphite material for a time greater than 1 minute, preferably for at time of more than 1 hour.

The gas and/or graphite material can be brought to a temperature ranging from −200° C. to 600° C., preferably from −20° C. to 200° C.

A stream of water vapour, which can be saturated or overheated, can also be advantageously fed together with the gas containing ozone.

The graphite used in the present invention can be natural or synthetic, it can have a particle diameter, measured as for carbon black, ranging from 0.5 to 50 μm, preferably from 1 to 15 μm, with a specific area of 5-20 $m^2/g$. An example is the product UF 2 of Kropfmuhl having a particle diameter equal to 4.5 micrometers.

Graphite material is intended as being that described by IUPAC (see "RECOMMENDED TERMINOLOGY FOR THE DESCRIPTION OF CARBON AS A SOLID", from IUPAC Recommendations, 1995).

Various methods, both physical and chemical, have been proposed in literature, which, starting from graphite oxide as precursor, allow nano-scaled graphene plates to be obtained for a potential use in polymeric nanocomposites, see, for example WO 2008/045778; Stankovich et al, Carbon, 45, 1558-1565 (2007); Tung et al, Nature Nanotech. 4, 25-29 (2008); WO 2008/048295; Si and Samulski, Nano Letters, 8, 1679-1682 (2008); WO 2009/018204; WO 2009/049375.

The rapid heating of GO, for example, can lead to the volatilization of the intercalants with a consequent expansion and thermal exfoliation of the graphene sheets. In patent application WO 2008/045778, it is specified that the rapid heating (>2000° C./min) of GO (or also GO slurry-water), in an inert atmosphere (for example nitrogen, argon or a mixture of the two), leads to an expansion/delamination of the graphite oxide.

Nano-scaled graphene plates are thus obtained, more specifically of the functionalized-FGS graphene type (with few epoxy, hydroxyl and carboxyl groups), electrically conductive and easily dispersible in the most common thermoplastic and elastomeric polymers. FGS materials with surface areas of about 1500 $m^2/g$ and with an XRD spectrum in which both the crystalline peak typical of pristine graphite and that typical of graphite oxide are absent, correspond to gradients in the order of 2,000° C./min.

Functionalized graphene (FGS) is different from expanded graphite. The latter has been proposed various times as a filler for plastic materials (USA 2008/0171824, USA 2008/0096988). In U.S. Pat. No. 6,444,714, for example, expanded graphite is used as flame retardant additive for expandable styrene polymers.

Expanded graphites are partially exfoliated graphites, typically with a worm-like appearance (USA 2008/0171824 and WO 04/5778), produced by the intercalation of graphite with a volatile expanding agent, for example sulfuric acid combined with nitric acid (USA 2008/0171824 and WO 04/5778). The intercalated material is then heated to a temperature sufficient for transforming the expanding agent into gas. The expansion of the gas generates a removal of the graphite layers and therefore an increase in the distance in the direction of the axis c (perpendicular to the layers). Although the heating leads to a removal of the layers in the direction of the axis c, the XRD spectrum of the expanded graphite generally shows however the crystalline peak typical of pristine graphite (2θ of about 26.5° for radiations Cu—Kα), associated with the distance between layers of about 0.34 nm. The presence of this peak and surface areas typically lower than 200 $m^2/g$ are indicative of only a partial exfoliation of the graphite. The nano-scaled graphene plates, to which the present invention relates, have an XRD spectrum without crystalline peaks typical of both pristine graphite and also graphite oxide.

The nano-scaled graphene plates can also be produced by the chemical reduction of GO, dispersed in aqueous solution, with the use of hydrazine hydrate ($H_2NNH_2$—$H_2O$) or other reducing agents (StanKovich et al, Carbon, 45, 1558-1565 (2007)). As the reduction proceeds, coalescence phenomena may arise, linked to the insolubility in aqueous environment of the reduced oxide, with consequent partial regraphitization phenomena.

Tung et al. (Nature Nanotech. 4, 25-29 (2008)) have reduced GO to pure hydrazine, obtaining hydrazine graphene (HG), electrically conductive, which can be dried and resuspended in organic solvents such as dimethylsulfoxide (DMSO) or N,N-dimethylformamide.

In patent application WO 2008/048295, the reduction of GO is effected in the presence of a polymeric material (for example poly(sodium 4-styrene sulfonate) (PSS), used at a high concentration (weight ratio 10:1=PSS:GO). This allows the production of nano-scaled graphene plates grafted with polymeric groups (for example PSS) thanks to which coalescence phenomena are avoided during the reduction.

In an alternative procedure, the graphite oxide can be functionalized by the insertion of isocyanate groups, as described in patent application WO 2008/048295. The GO functionalized with isocyanate (iGO) has a reduced hydrophilic nature, with respect to graphite oxide. The iGO can therefore form stable dispersions in suitable aprotic organic solvents (for example N,N-dimethylformamide, dimethylsulfoxide, N-methylpyrrolidone) in which it is also possible to dissolve the polymer of interest.

Stankovich et al (WO 2008/048295; Nature, 442, 282-286 (2006)) have proposed a method for the reduction of iGO, dispersed in a solution of N,N-dimethylformamide and polystyrene, with dimethylhydrazine. This method allows conductive nano-scaled graphene plates to be obtained, contemporaneously avoiding agglomeration phenomena of the same during the reduction.

Si e Samulski (Nano Letters, 8, 1679-1682 (2008)) have proposed a method for the preparation of nano-scaled graphene plates, soluble in both water and organic solvents (such as methanol, acetone, acetonitrile). The method consists of three fundamental steps: a pre-reduction of the graphite oxide with sodium borohydride; a sulfonation whereby p-phenyl-$SO_3H$ groups are introduced into the GO; finally, a post-reduction with hydrazine.

Alternative synthesis methods for the production of nano-scaled graphene plates envisage the exfoliation of graphite or its derivatives (US 2009/0026086; US 2008/0206124; US 2008/0258359; US 2009/0022649; Hernandez et al, Nat. Nanotechnol. 3, N. 9, pages 563-568, 2008; Hernandez et al, J. Am. Chem. Soc., 2009, 131 (10), pages 3611-3620; US 2009/0155578; Li et al, Science 319, 1229-1232 (2008); Li et al, Nature Nanotech. 3, 538-542 (2008)) with the use of chemical and/or physical methods.

Patent application US 2008/0206124, for example, describes a method for the production of nano-scaled graphene plates, with a thickness lower than 100 nm, starting from graphite or its derivatives (carbon fibres, highly oriented pyrolitic graphite, graphite nano-fibres, pre-intercalated graphite, etc.). This method consists of two fundamental steps:
1. intercalation of graphite, or its derivatives, with the use of halogen molecules (Bromine, Iodine, etc.) in vapour phase. The intercalation process is effected at temperatures higher than the melting point or sublimation point of said molecules;
2. exfoliation of the intercalated compound by means of two alternative procedures: the first comprises heating the intercalated compound to temperatures above the boiling point of the halogen molecules, the consequent expansion of the latter and exfoliation of the graphite layers; a further separation of the layers can be obtained with subsequent mechanical treatment, for example by the grinding of the thermally exfoliated product. The second envisages the liquid exfoliation of the intercalated compound in specific solvents combined with an ultrasound treatment.

Hernandez et al, "High-Yield Production of Graphene by Liquid-phase Exfoliation of Graphite", Nat. Nanotechnol. 3, N. 9, pages 563-568, 2008, describe a method for obtaining colloidal suspensions of single high-quality graphene sheets by sonication and the consequent exfoliation of the graphite in organic solvents such as N-methyl pyrrolidone (NMP), N,N-dimethyl acetamide, γ-butyrolactone, 1,3-dimethyl-2-imidazolidinone (DMEU).

Alternatively, said dispersion of graphene sheets can be obtained starting from the exfoliation of graphite in aqueous solution, with the use of suitable surfactants such as sodium dodecylbenzene sulfonate (see for example Hernandez et al. "Liquid Phase Production of Graphene by Exfoliation of Graphite in Surfactant/Water Solutions", J. Am. Chem. Soc., 2009, 131 (10), pages 3611-3620). As indicated in the articles of Hernandez et al. mentioned above, however, the performance of these processes is generally limited, the authors indicate yields of 1-12%.

Patent application US 2009/0155578 describes nano-scaled graphene plates with high length/width ratios (higher than 3) obtained by the intercalation of carbon fibres or graphite fibres and the subsequent exfoliation of the intercalated compound. The intercalation can be effected with the use of various intercalating agents (for example sulfuric acid, nitric acid, carboxylic acid, halogen molecules in liquid or vapour phase, alkaline metals, supercritical carbon dioxide, etc.). In an alternative procedure, the intercalation is effected electrochemically. The intercalated product is obtained by means of an electrochemical reaction in which an acid is used (formic, nitric or carboxylic acid) as both an electrolyte and as intercalating agent and carbon fibres or graphite fibres as anode. The intercalated products, with one of the above procedures, are then thermally exfoliated (at temperatures varying from 300 to 1,100° C.) and finally mechanically treated (for example by grinding) to obtain nano-scaled graphene plates having the desired dimensions.

Patent application US 2009/0022649 describes ultra-fine nano-scaled graphene plates, with thicknesses not greater than 2 nm, obtained by re-intercalation and subsequent exfoliation of nano-scaled plates (with thicknesses<10 nm) in turn obtained by the intercalation of graphite or its derivatives and subsequent exfoliation of the intercalated compound. Some examples of intercalation/exfoliation processes have been previously described (for example relating to patent US 2009/0155578). Again patent application US 2009/0022649 describes an alternative procedure for obtaining nano-scaled graphene plates, with thicknesses not greater than 2 nm. This alternative procedure envisages the use of ultrasounds, under suitable conditions of time and energy level, for exfoliating graphite in solution or possibly nano-scaled plates with intermediate thicknesses (<10 nm) without passing through the intercalation step.

Li et al, "Chemically Derived, Ultrasmooth Graphene Nanoribbon Semiconductors", Science 319, 1229-1232 (2008); Li et al, "Highly Conducting Graphene Sheets and Langmuir-Blodgett Films", Nature Nanotech. 3, 538-542 (2008) describe chemically modified graphene (CMG) obtained starting from expandable/expanded graphite. According to a first procedure, the expanded graphite is sonicated in a solution of dichloroethane and poly(m-phenylenevinylene-co-2,5-dioctoxy-p-phenylenevinylene) (PmPV), from which a stable suspension of graphene "nanoribbon" is obtained (Li et al, "Chemically Derived, Ultrasmooth Graphene Nanoribbon Semiconductors", Science 319, 1229-1232 (2008)).

Another type of approach (Li et al, "Highly Conducting Graphene Sheets and Langmuir-Blodgett Films", Nature Nanotech. 3, 538-542 (2008)) is based on the re-intercalation of expanded graphite with oleum and the subsequent expansion of the latter by the insertion, between the graphite layers, of tetrabutylammonium hydroxide. The graphite thus re-intercalated is sonicated in N,N-dimethyl-formamide (DMF) in the presence of a polyethyleneglycol-phospholipid (DSPE-mPEG). The resulting final suspension consists of about 90% of single graphene sheets with adsorbed polymeric chains.

Osváth et al, (Carbon 45, 3022-3026, (2007)) describe a method for obtaining single graphene layers by means of thermal treatment in air at a high temperature (450-550° C.) of a commercial exfoliated graphite (1 mg in 20 ml of benzene).

The nano-scaled graphene plates were sintered also starting from non-graphite precursors (US 2006/0216222; Stride et al, Nature Nanotech. 4, 30-33 (2009); WO 2009/029984). A first procedure (US 2006/0216222) is based on the total graphitization (1,000-3,000° C.) or partial graphitization (300-1,000° C.) of a polymeric precursor (for example polyacrylonitrile fibres and phenol-formaldehyde resins) or petroleum or carbon fossil tar. The resulting product, with a carbon-like or graphite-like structure, is subjected to subsequent exfoliation by treatment in solution, in the presence of oxidizing or intercalating agents. The exfoliated particles are finally subjected to a mechanical treatment (for example grinding) to further separate the graphene layers and obtain graphene particles with nanometric dimensions (nano-scaled plates).

In an alternative procedure (Stride et al, Nature Nanotech. 4, 30-33 (2009); WO 2009/029984), quantities of graphene in the order of grams were produced starting from a reaction between metallic sodium (Na) and ethanol (EtOH). The synthesis method consists in reacting, at 220° C. for 72 hours, 2 g of Na in 5 ml of EtOH (molar ratio 1:1). The reaction generates a graphene precursor (a solvothermal such as, for example, a metallic alkoxide) which is subsequently pyrolized to obtain graphene; the latter is then washed in deionized water, filtered and dried.

The nano-scaled graphene plates described above can be incorporated in the polymeric composition, object of the present invention, as such or also in the form of masterbatch.

A first method for the preparation of the masterbatch is the process in solution in which the polymer is dissolved in an adequate solvent, for example, N,N-dimethylformamide, N-methylpyrrolidone, tetrahydrofuran, etc. The nano-scaled graphene plates are then added to the solution and dispersed, for example with the use of a sonic flow. In an alternative procedure, the nano-scaled graphene plates can be pre-dispersed in a portion of solvent and said dispersion is subsequently mixed with the polymeric solution. In many cases, the solvent can be low-boiling so as to be removed from the product by evaporation. When a higher-boiling solvent is used, the composite can be recovered by precipitation followed by filtration and/or centrifugation. The methods in solution are particularly useful when the nano-scaled graphene plates are directly synthesized in the form of stable suspensions in suitable solvents (Tung et al, Nature Nanotech. 4, 25-29 (2008); WO 2008/048295; Si and Samulski, Nano Letters, 8, 1679-1682 (2008); US 2008/0206124; Hernandez et al, Nat. Nanotechnol. 3, N. 9, pages 563-568, 2008); US 2009/0022649; Li et al, Science 319, 1229-1232 (2008); Li et al, Nature Nanotech. 3, 538-542 (2008)).

A second method for the preparation of the masterbatch consists in mixing in the molten state, in which the polymer is brought to temperatures higher than the melting point or softening point and then mixed with the nano-scaled graphene plates. The nano-scaled plates used for this purpose are preferably in powder form, such as those synthesized according to the procedures described in patent applications WO 2008/045778; US 2008/0206124; US 2009/0155578; US 2009/0022649; US 2006/0216222; WO 2009/029984. The mixing can be effected with devices commonly used for the processing of plastic materials (twin-screw extruder, Brabender mixer, etc.).

In a further alternative procedure, the polymer in powder form and the nano-scaled graphene plates, also in powder form, can be pre-mixed by dry blending or turbomixing and subsequently processed in mixers in the molten state. The pre-mixing guarantees a better dispersion degree of the nano-charge inside the polymer matrix.

Another alternative method is represented by polymerization in-situ, in which the nano-scaled graphene plates are dispersed in a monomer which is subsequently polymerized. The monomer can also be dissolved in a suitable solvent so that the low viscosities can ensure a good dispersion degree of the nano-charges. The polymerization can also be carried out under stirring conditions in order to ensure that the nano-scaled plates remain dispersed during the process.

The nano-scaled plates can possibly be functionalized before polymerization. In particular, they can be inserted in the vinyl groups. In this way, the nano-scaled plates can be co-polymerized, thus preventing re-aggregation even if the polymer itself is brought beyond the melting point.

The Applicant has also found a method for producing said nano-scaled graphene plates during the polymerization itself. This method allows an optimum dispersion of the nano-scaled plates to be obtained.

In general, nano-scaled plates, in fact, naturally tend to become agglomerated, and consequently when, for example, graphite oxide is reduced in an aqueous environment, the nano-scaled plates tend to be separated from the solvent and become agglomerated. In order to avoid this phenomenon, they can be partially oxidized or functionalized. These modifications, however, induce a variation in the atomic structure which generally causes a reduction in the absorption capacity of the infrared light and consequently a reduction in the thermal and electric conductivity. These variations are therefore generally undesired.

The Applicant, however, has found a method for preventing agglomeration, at the same time maintaining a low concentration of functionalizations in the graphene.

This method comprises dispersing a precursor of the nano-scaled graphene plates, such as graphite oxide, in an aqueous suspension. The monomer is then added and the polymerization is subsequently carried out in suspension. Contemporaneously, or before initiating the polymerization, but with the monomer already suspended in the aqueous solution, reducing agents are added in order to reduce the precursor of the nano-scaled graphene plates.

In this case, it is preferable for most of the reducing agent to be hydrophilic (for example, hydrazine), even if a quota of hydrophobic reducing agent (for example methyl-hydrazine) can still be used.

The polymerization can be terminated following the normal methods in use.

The present invention is completely described in the enclosed claims.

An object of the present invention therefore relates to compositions of expandable thermoplastic polymers, for example in granules or beads, which comprise:
  a) a thermoplastic polymeric matrix produced by the polymerization of a base comprising one or more polymerizable monomers;
  b) 1-10% by weight, calculated with respect to the polymer (a), of an expanding agent englobed in the polymeric matrix;
  c) 0.004-15% by weight, preferably 0.01-5%, even more preferably 0.05-2%, calculated with respect to the polymer (a), of an athermanous filler comprising nano-scaled graphene plates.

In particular, the nano-scaled graphene plates, to which the present invention relates, have a thickness (orthogonal to the graphene sheet) not greater than 150 nm. The thickness is preferably less than 50 nm, even more preferably, the thickness ranges from 0.3 to 5 nm. Said nano-scaled plates also have an average dimension (length, width, or diameter) not greater than 10 micrometers, preferably not greater than 1 micrometer, even more preferably not greater than 500 nm. The nano-scaled graphene plates, to which the present invention relates, have a surface area>50 $m^2/g$. The surface area preferably ranges from 100 to 2,600 $m^2/g$, even more preferably the surface area ranges from 300 to 2,600 $m^2/g$.

An object of the present invention also relates to the foams deriving from the use of the expandable compositions described above, in which the expanding agent is therefore no longer contained in the composition or is contained in a smaller percentage.

According to the present invention, the polymerizable monomers are selected from vinyl monomers, such as ethylene or propylene, and vinyl aromatic monomers. Vinyl aromatic monomers are preferred however.

According to an alternative embodiment of the present invention, however, the athermanous filler can comprise, in addition to said nano-scaled graphene plates, up to 6% by weight, calculated with respect to the polymer, for example from 0.01 to 6% by weight, preferably from 0.05 to 4.5% by weight, of further athermanous agents such as graphite and/or carbon coke and/or carbon black, as synergic agents. The graphite can be natural or synthetic, and can possibly be of the expandable or expanded type. The graphite, carbon coke or carbon black can have a particle diameter, measured by laser diffraction, ranging from 0.5 to 50 μm.

The polymeric compositions, object of the present invention, can be prepared, in relation to the polymeric matrix and starting monomer, as better illustrated hereunder, by means of:

1. a process in suspension, which comprises the dissolution/dispersion of the nano-scaled graphene plates, and possible additives, in the monomer, followed by polymerization in aqueous suspension and addition of the expanding agent; or 2. a process in suspension which comprises the suspension, for example aqueous, of a preformed polymeric composition comprising said polymeric matrix and said nano-scaled graphene plates, followed by the addition and incorporation of the expanding agent; or 3. a continuous mass process which includes the following steps, in series:

mixing a thermoplastic polymer in the form of granules or powder or already in the molten state, with said nano-scaled graphene plates (as such or in the form of master-batch) and other possible additives;

possibly, if not already in the molten state, bringing the thermoplastic polymeric mixture to a temperature higher than the melting point of the polymer;

incorporating the expanding agent in the molten thermoplastic polymer, together with other possible additives, such as the flame-retardant systems described hereunder;

mixing the polymeric composition thus obtained by means of static or dynamic mixing elements;

feeding the polymeric composition thus obtained to a cutting die under pressure (for example according to the procedures described in U.S. Pat. No. 7,320,585);

4. a direct extrusion process, i.e. feeding a mixture of granules of thermoplastic polymer and nano-scaled graphene plates (as such, or in master-batch form), directly to an extruder, into which the expanding agent is also fed.

Alternatively, in the case of a vinyl aromatic polymer, this can come already in the molten state from a polymerization plant, subsequently adding the athermanous filler. The expanding agent is then added and the relative product is then cooled and passed through a die for granulation or also for the direct preparation (direct extrusion) of sheets, tubes, expanded sheets, etc.

The term "vinyl aromatic monomer", as used in the present description and claims, essentially means a product corresponding to the following general formula:

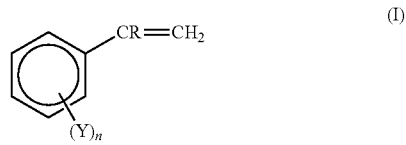

wherein R is a hydrogen or a methyl group, n is zero or an integer ranging from 1 to 5 and Y is a halogen, such as chlorine or bromine, or an alkyl or alkoxyl radical having 1 to 4 carbon atoms.

Examples of vinyl aromatic monomers having the general formula identified above, are: styrene, α-methylstyrene, methylstyrene, ethylstyrene, butylstyrene, dimethylstyrene, mono-, di-, tri-, tetra- and penta-chlorostyrene, bromo-styrene, methoxystyrene, acetoxystyrene, etc. Preferred vinyl aromatic monomers are styrene and α-methylstyrene.

The vinyl aromatic monomers corresponding to general formula (I) can be used alone or in a mixture up to 50% by weight with other co-polymerizable monomers. Examples of said monomers are (meth)acrylic acid, $C_1$-$C_4$ alkyl esters of (meth)acrylic acid such as methyl acrylate, methyl methacrylate, ethyl acrylate, ethyl methacrylate, isopropyl acrylate, butyl acrylate, amides and nitriles of (meth)acrylic acid such as acrylamide, methacrylamide, acrylonitrile, methacrylonitrile, butadiene, ethylene, divinyl benzene, maleic anhydride, etc. Preferred co-polymerizable monomers are acrylonitrile, methyl methacrylate.

Any expanding agent capable of being englobed in the thermoplastic polymeric matrix can be used in combination with the expandable polymers object of the present invention. Typical examples are aliphatic hydrocarbons, Freon, carbon dioxide, alcohols such as ethyl alcohol, water, etc.

Conventional additives, generally used with traditional materials, such as pigments, stabilizing agents, nucleating agents, flame-retardant systems, antistatic agents, release agents, etc., can be added to the compositions of expandable thermoplastic polymers, object of the present invention. In particular, a flame-retardant system can be added to the present composition, comprising from 0.1 to 8%, with respect to the polymer (a), of a self-extinguishing brominated additive containing at least 30% by weight of bromine and from 0.05 to 2% by weight, again with respect to the polymer (a), of a synergic product containing at least one C—C or O—O weak bond, as described hereunder.

At the end of the addition of the athermanous filler, the expanding agent and possible additives, an expandable thermoplastic polymer is obtained in granules or beads, which can be transformed to produce expanded articles having a density ranging from 5 to 50 g/l, preferably from 10 to 25 g/l. For direct extrusion, on the other hand, densities of 20 to 40 g/l are used.

These expanded articles have an excellent heat insulation capacity, expressed by a thermal conductivity ranging from 25 to 50 mW/mK, preferably from 29 to 45 mW/mK, which is generally even more than 10% lower with respect to that of equivalent expanded articles obtained from non-filled materials currently on the market, for example EXTIR A-5000 of Polimeri Europa SpA.

Thanks to these characteristics of the expandable thermoplastic polymers object of the present invention, it is possible to prepare heat-insulating articles with a significant saving of material or, for example, to prepare sheets with a lesser thickness than those prepared with traditional non-filled polymers, with a consequent saving in space and product.

Included in the definition of expanded articles are expanded extruded sheets of thermoplastic polymers comprising a cellular matrix, for example of a vinyl or vinyl aromatic polymer, such as polyethylene or polystyrene, having a density ranging from 10 to 200 g/l, an average cell dimension ranging from 0.01 to 1.00 mm and containing from 0.004 to 15% by weight, preferably from 0.01 to 5%, more preferably from 0.05 to 2%, calculated with respect to the thermoplastic polymer, of said athermanous filler comprising said nano-scaled graphene plates with a thickness (orthogonal to the graphene sheet) not greater than 150 nm. The thickness is preferably less than 50 nm, the thickness even more preferably ranges from 0.3 to 5 nm. Said nano-scaled plates also have an average dimension (length, width, or diameter) not greater than 10 micrometers, preferably not greater than 1 micrometer, even more preferably not greater than 500 nm. Said nano-scaled graphene plates have a surface area>50 $m^2/g$. The surface area preferably ranges from 100 to 2,600 $m^2/g$, even more preferably the surface area ranges from 300 to 2,600 $m^2/g$.

The athermanous filler, added to the thermoplastic polymer of the expanded extruded sheet, in addition to comprising said nano-scaled plates, can comprise up to 6% by weight, calculated with respect to the polymer, for example from 0.01 to 6% by weight, preferably from 0.05 to 4.5% respectively, of said further athermanous additives, such as graphite and/or carbon coke and/or carbon black, as synergic agents.

Said expanded extruded sheets can also contain conventional additives normally used with traditional materials, such as pigments, stabilizers, nucleating agents, flame-retardant systems, antistatic agents, release agents, etc.

A further object of the present invention relates to processes for the preparation of said compositions based on expandable thermoplastic polymers, for example in beads or granules, having an improved thermal insulation capacity and a density, after expansion, lower than 50 g/l.

In particular, a further object of the present invention relates to a process for preparing expandable vinyl aromatic polymers, in beads or granules, which comprises polymerizing in aqueous suspension one or more vinyl aromatic monomers, possibly together with at least one polymerizable co-monomer in quantities up to 50% by weight, in the presence of said athermanous filler comprising:
  said nano-scaled graphene plates with a thickness (orthogonal to the graphene sheet) not greater than 150 nm. The thickness is preferably less than 50 nm, the thickness even more preferably ranges from 0.3 to 5 nm. Said nano-scaled plates also have an average dimension (length, width, or diameter) not greater than 10 micrometers, preferably not greater than 1 micrometer, even more preferably not greater than 500 nm. Said nano-scaled graphene plates have a surface area>50 $m^2/g$. The surface area preferably ranges from 100 to 2,600 $m^2/g$, even more preferably the surface area ranges from 300 to 2,600 $m^2/g$.
  a peroxide radical initiator system, and
  an expanding agent added before, during or at the end of the polymerization.

The athermanous filler, in addition to comprising said nano-scaled plates, can also comprise up to 6% by weight, calculated with respect to the polymer, for example from 0.01 to 6% by weight, preferably from 0.05 to 4.5% by weight respectively, of said further athermanous additives, such as graphite and/or carbon coke and/or carbon black, as synergic agents.

The polymerization is carried out in an aqueous suspension with inorganic salts of phosphoric acid, for example, tricalcium phosphate or magnesium phosphate. These salts can be added to the polymerization mixture either already finely subdivided or synthesized in situ by reaction, for example, between sodium pyrophosphate and magnesium sulphate.

Said inorganic salts are assisted in their suspending action by anionic surface-active agents, for example sodium dodecylbenzene sulfonate or their precursors such as sodium metabisulfite, as described in U.S. Pat. No. 3,631,014.

The polymerization can also be carried out in the presence of organic suspending agents such as polyvinylpyrrolidone, polyvinyl alcohol, etc.

The initiating system normally comprises two peroxides, the first with a halving time of an hour at 85-95° C. and the other with a halving time of an hour at 110-120° C. Examples of these initiators are tert-butylperoxy-2-ethylhexanoate and tert-butylperbenzoate.

The vinyl aromatic polymer or copolymer which is obtained has an average molecular weight Mw ranging from 50,000 to 300,000, preferably from 70,000 to 200,000. In general, more details on procedures for the preparation of expandable vinyl aromatic polymers in aqueous solution or, more generally, polymerization in suspension, can be found in Journal of Macromolecular Science, Review in Macromolecular Chemistry and Physics C31 (263) 215-299 (1991).

To improve the stability of the suspension, it is possible to increase the viscosity of the reagent solution of vinyl aromatic monomers, to be suspended in water, by dissolving vinyl aromatic polymer in the same, up to a concentration of 1 to 30% by weight, preferably from 5 to 20%, calculated with respect to the monomers. The solution can be obtained by dissolving a preformed polymer in the reagent mixture (for example fresh polymer or waste-products from previous polymerizations and/or expansions) or by a mass pre-polymerization of the monomer, or mixture of monomers, until the previously mentioned concentrations are obtained, and subsequently continuing the polymerization in aqueous suspension in the presence of the remaining additives.

During the polymerization in suspension, polymerization additives are used, according to methods well-known to experts in the field, which are typically those for producing expandable vinyl aromatic polymers, such as stabilizing agents of the suspension, chain-transfer agents, expansion adjuvants, nucleating agents, plasticizers, etc. In particular, during the polymerization, it is preferable to add an anti-flame system comprising flame-retardants, in a quantity ranging from 0.1 to 8% and synergic products in quantities ranging from 0.05 to 2% with respect to the resulting weight of the polymer. Flame-retardants particularly suitable for the expandable vinyl aromatic polymers object of the present invention are aliphatic, cyclo-aliphatic compounds, brominated aromatic compounds, such as hexabromocyclododecane, pentabromomonochlorocyclohexane and pentabromophenyl allyl ether. Synergic products which can be used are dicumyl peroxide, cumene hydroperoxide, 3,4-dimethyl-3,4-diphenyl-hexane, 3,4-dimethyl-3,4-diphenyl butane, 3,6,9-triethyl-3,6,9-trimethyl-1,4,7-triperoxy-nonane.

The expanding agents are preferably added during the polymerization phase, or subsequently by means of the re-suspension technology. In particular, the latter comprises the phases of:
  polymerizing in aqueous suspension one or more vinyl aromatic monomers at least in the presence of the athermanous filler;
  separating the beads or granules thus obtained;
  re-suspending the beads or granules in water and heating until their spherical form is obtained;

adding the expanding agents to the suspension and keeping the beads in contact with the same until impregnation; and re-separating the beads.

The expanding agents are selected from aliphatic or cycloaliphatic hydrocarbons containing from 3 to 6 carbon atoms such as n-pentane, iso-pentane, cyclopentane or blends thereof; halogenated derivatives of aliphatic hydrocarbons containing from 1 to 3 carbon atoms, such as, for example, dichlorodifluoromethane, 1,2,2-trifluoro-ethane, 1,1,2-trifluoroethane; carbon dioxide; water; and ethyl alcohol.

At the end of the polymerization, whether it be in suspension or re-suspension, substantially spherical beads/granules of expandable polymer are obtained, with an average diameter ranging from 0.2 to 2 mm, preferably from 1 to 1.5 mm, in which said athermanous filler and said other possible additives, are homogeneously dispersed.

The granules are then discharged from the polymerization reactor and washed, in continuous or batchwise, with non-ionic surfactants or, alternatively, with acids, as described in U.S. Pat. No. 5,041,465. The polymer granules can subsequently be treated thermally with hot air ranging from 30 to 60° C.

A further object of the present invention relates to a process for preparing in continuous mass, compositions based on expandable thermoplastic polymers, in granules or beads, which comprises the following steps in series:

i. mixing a thermoplastic polymer in granules/pellets or in powder form or already in the molten state, with an average molecular weight Mw ranging from 50,000 to 300,000, preferably from 70,000 to 200,000, with said athermanous filler comprising said nano-scaled graphene plates having a thickness (orthogonal to the graphene sheet) not greater than 150 nm. The thickness is preferably lower than 50 nm, even more preferably the thickness ranges from 0.3 to 5 nm. Said nano-scaled plates also have an average dimension (length, width, or diameter) not greater than 10 micrometers, preferably not greater than 1 micrometer, even more preferably not greater than 500 nm. Said nano-scaled graphene plates have a surface area >50 $m^2/g$. The surface area preferably ranges from 100 to 2,600 $m^2/g$, even more preferably the surface area ranges from 300 to 2,600 $m^2/g$. The athermanous filler, in addition to said nano-scaled graphene plates, can comprise up to 6% by weight, calculated with respect to the polymer, for example from 0.01 to 6% by weight, preferably from 0.05 to 4.5% respectively, of said further athermanous additives, such as graphite and/or carbon coke and/or carbon black, as synergic agents. Other possible additives, already described, among which pigments, stabilizers, nucleating agents, said flame-retardant systems, antistatic agents, release agents, etc. can also be added in this step either totally or partially;

ii. optionally, if not already in the molten state, bringing the polymeric mixture to a temperature higher than the melting point of the thermoplastic polymer;

iii. incorporating said expanding agent and possibly the remaining amount, part or all, of said other additives in the molten polymer;

iv. mixing the polymeric composition thus obtained by means of static or dynamic mixing elements; and v. granulating the composition thus obtained in a device which comprises a die, a cutting chamber and a cutting system.

At the end of the granulation, granules/beads of expandable thermoplastic polymer can be obtained with a substantially spherical form having an average diameter ranging from 0.2 to 2.3 mm, preferably from 1 to 1.5 mm, inside which said athermanous filler, said possible further synergic athermanous additives and said other further additives, are homogeneously dispersed, to the naked eye.

According to the present invention, step (i) can be effected by feeding the polymeric granule already formed, possibly mixed with processing waste products, into an extruder. The single components of the composition, object of the present invention, are mixed therein, the polymeric part is subsequently melted and an expanding agent and other possible additives are then added.

Alternatively, in the case of vinyl aromatic polymers, the polymer can be used already in the molten state, coming directly from the polymerization plant in solution, in particular from the relative devolatilization unit, according to a process known to experts in the field as "continuous mass process". The molten polymer is fed to suitable devices, for example a dynamic mixer or a static mixer, where it is mixed with the additives, for example with the athermanous filler and with the expanding agent and it is subsequently extruded to give the product in expandable granules/beads, object of the present invention. The granules (or beads) of the thermoplastic polymeric composition can be re-baked for example at a temperature lower than or equal to the glass transition temperature (Tg) or slightly higher, for example the Tg increased by up to 8° C., possibly under pressure. A detailed method for preparing vinyl aromatic polymers in continuous mass, is described in international patent application WO 03/53651.

In general, it is possible to incorporate at least said athermanous filler in a master-batch, preferably based on a thermoplastic polymer compatible with that of the polymer matrix (a), having an average molecular weight Mw ranging from 50,000 to 300,000, preferably from 70,000 to 200,000, to facilitate its mixing with the polymeric stream and to simplify the plant management. In the master-batch, the content of athermanous filler, comprising said nano-scaled graphene plates and possible said graphite and/or carbon coke and/or carbon black, ranges from 15 to 60% by weight.

In particular, in the case of polymerization in aqueous suspension, the master-batch in pellets can be dissolved in the vinyl aromatic monomer. In the case of mass polymerization, on the other hand, the master-batch in pellet form can be mixed with the granule of thermoplastic polymer or with the vinyl aromatic polymer in the molten state coming from polymerization in solution.

Even more specifically, in the case of polymerization in continuous mass of vinyl aromatic polymers, the master-batch in pellets can be dissolved in the vinyl aromatic monomer/solvent mixture before this is fed to the polymerization reactor in solution.

At the end of the polymerization of the vinyl aromatic polymers, whether it be in suspension or mass or continuous mass, the expandable beads or granules obtained can be subjected to pre-treatment which is normally applied to conventional expandable compositions and which essentially consists in:

1. covering the beads or granules with a liquid antistatic agent selected from amines, ethoxylated tertiary alkylamines, ethylene oxide/propylene oxide copolymers, etc. Said agent allows the coating to adhere and facilitates the screening of the beads prepared in suspension;

2. applying the coating to said beads or granules, said coating essentially consisting of a mixture of mono-, di- and tri-esters of glycerine (or other alcohols) with fatty acids, and metal stearates such as zinc and/or magnesium stearate, possibly also mixed with carbon black.

A further object of the present invention relates to a process for the production of expanded extruded sheets of thermoplastic polymers which comprises:

a1. mixing a thermoplastic polymer in the form of pellets or granules or beads, selected from a vinyl or vinyl aromatic polymer such as polyethylene or polystyrene, and at least said athermanous filler comprising said nano-scaled graphene plates having a thickness (orthogonal to the graphene sheet) not greater than 150 nm. The thickness is preferably lower than 50 nm, even more preferably the thickness ranges from 0.3 to 5 nm. Said nano-scaled plates also have an average dimension (length, width, or diameter) not greater than 10 micrometers, preferably not greater than 1 micrometer, even more preferably not greater than 500 nm. Said nano-scaled graphene plates have a surface area>50 m$^2$/g. The surface area preferably ranges from 100 to 2,600 m$^2$/g, even more preferably the surface area ranges from 300 to 2,600 m$^2$/g.

b1. heating the mixture (a1) to a temperature ranging from 180 to 250° C. so as to obtain a polymeric melt which is subjected to homogenization;

c1. adding at least one expanding agent to the polymeric melt, and possibly said other additives, for example said flame-retardant system;

d1. homogenizing the polymeric melt which at least englobes the expanding agent;

e1. homogeneously cooling the polymer melt (d1) to a temperature not higher than 200° C. and not lower than the Tg of the resulting polymeric composition;

f1. extruding the polymeric melt through a die in order to obtain an expanded polymeric sheet.

According to an embodiment of the process for the production of expanded extruded sheets, which is a further object of the present invention, the athermanous filler added to the thermoplastic polymer, in addition to said nano-scaled graphene plates, can also comprise up to 6% by weight, calculated with respect to the polymer, for example from 0.01 to 6% by weight, preferably from 0.05 to 4.5% respectively, of said further athermanous additives, such as graphite and/or carbon coke and/or carbon black, as synergic agents.

According to an alternative embodiment of the process for the production of expanded extruded sheets, object of the present invention, the thermoplastic polymer in pellet form is either totally or partially substituted by the compositions of thermoplastic vinyl or vinyl aromatic polymers in beads/granules described or prepared according to one of the processes described above.

Also in the process for the production of expanded extruded sheets based on thermoplastic vinyl or vinyl aromatic polymers, said athermanous filler can be used by means of said master-batch.

More details on processes for the preparation of expanded extruded sheets of thermoplastic polymers can be found in International patent application WO 06/128656.

Some illustrative and non-limiting examples are provided hereunder for a better understanding of the present invention and for its embodiment.

Example 1

PART A—Preparation of Nano-Scaled Graphene Plates by the Liquid Exfoliation of Graphite 20 parts of graphite "UF1 98.5", produced by Kropfmuhl, are dispersed in 880 parts of N-methyl pyrrolidone (Sigma Aldrich) with a magnetic anchor stirrer. An ultrasonic field is applied, under stirring, by means of a sonotrode calibrated at 20 kHz and with a specific power, calculated on the basis of the absorbed power of the generator, equal to about 100 W/liter. After about 2 hours, the product thus obtained is subjected to centrifugation. The supernatant product is collected and then put again under stirring, this time by means of a mechanical stirrer (Silverson Machines). 100 parts of polystyrene of the EDISTIR N1782 type (polystyrene having a Mw equal to 130,000 g/mol, Mw/Mn=2.3, MFI (200° C., 5 kg) equal to 25 g/10', produced by Polimeri Europa) are pulverized and then slowly poured, maintaining the solution under continuous stirring. The temperature is maintained at about 120° C. for the whole processing cycle.

PART B—Preparation of Expandable Polystyrene Containing Nano-Scaled Graphene Plates 900 parts of polystyrene of the EDISTIR N2982 type (polystyrene having a Mw equal to 180,000 g/mol, Mw/Mn=2.3, MFI (200° C., 5 kg) equal to 7.5 g/10', produced by Polimeri Europa) are melted in a single-screw extruder.

66 parts of polystyrene N1782 produced by Polimer Europa; 2 parts of ethylene-bis-stereamide; 10 parts of Saytex HP900 (hexabromocyclododecane sold by Alberarle); 2 parts of Perkdadox 30 (2,3-dimethyl-2,3-diphenylbutane, sold by Akzo Nobel) are mixed in a twin-screw extruder. 20 parts of the solution first produced in parte A are fed to the twin-screw extruder by means of a side inlet.

50 parts of a mixture of n-pentane (75%) and isopentane (25%) and the stream leaving the twin-screw extruder are added to the polymeric melt leaving the single-screw extruder. The mixture thus obtained is mixed by means of a series of static mixing elements. A gear pump increases the pressure of the mixture thus obtained to 200 barg. The mixture is then cooled to about 170° C. by means of a mixing exchanger (SMR). The composition is then distributed to the die, where it is extruded through a number of holes having a diameter of 0.5 mm, immediately cooled with a jet of water and cut with a series of rotating knives (according to the method described in U.S. Pat. No. 7,320,585).

The pressure in the granulation chamber is 5 bar and the shear rate is selected so as to obtain granules having an average diameter of 1.2 mm. The water is used as a cooling spray liquid and nitrogen is used as carrier gas.

The resulting granules are dried with a centrifugal drier and then covered with a coating. The coating is prepared by adding to the granules 3 parts of glyceryl monostearate, 1 part of zinc stearate and 0.2 parts of glycerine per 1,000 parts of dried granules. The additives of the coating are mixed with the granulate by means of a continuous screw mixer.

The product is pre-expanded to 17 g/l with vapour at a temperature of 100° C., left to age for 1 day and used for the moulding of blocks (having dimensions of 1040×1030×550 mm).

The blocks were then cut to prepare flat sheets on which the thermal conductivity is measured. The thermal conductivity proved to be 33.8 mW/mK.

Some of the sheets, obtained from the same blocks, are put in an oven at 70° C. for 2 days. Test samples are then collected (9 cm×19 cm×2 cm) for the fire behaviour test according to the standard DIN 4102. The test samples pass the test.

Example 2

PART A—Preparation of the Concentrate

The product obtained according to Example 1, parte A, is put under vacuum and the temperature is brought to about 170° C., for 3 hours, under continuous stirring and with a slight bubbling of nitrogen. 500 parts of solvent are thus evaporated and recondensed in a separate container for possible re-use.

PART B—Preparation of Expandable Polystyrene Containing Nano-Scaled Graphene Plates 89.8 parts of ethylbenzene, 730.0 parts of styrene, 56.2 parts of α-methylstyrene and 0.2 parts of divinylbenzene are fed to a stirred reactor.

123.8 parts of the preparation obtained in Part A are fed into the reactor and dissolved (total: 1,000 parts). The reaction is then carried out at 125° C. with an average residence time of 2 hours. The fluid composition at the outlet is then fed to a second reactor where the reaction is completed at 135° C. with an average residence time of 2 hours.

The resulting composition, which is hereafter referred to as "Composition (A)", having a conversion of 72%, is heated to 240° C. and subsequently fed to the devolatilizer to remove the solvents and residual monomer. It is characterized by a molecular weight Mw of 200,000 g/mol and a Mw/Mn ratio of 2.8, wherein Mw is the weight average molecular weight and Mn is the number average molecular weight.

Composition (A) is fed from the devolatilizer to a heat exchanger to lower its temperature to 170° C.

130.9 parts of polystyrene N2982 produced by Polimeri Europa, 14.0 parts of Saytex HP900 (hexabromocyclododecane sold by Alberarle) and 5.1 parts of Perkadox 30® (2,3-dimethyl-2,3-diphenylbutane, sold by Akzo Nobel) for a total of 150 parts, are fed to a second twin-screw extruder. A gear pump increases the feeding pressure of this molten additive to 260 barg. 50 parts of a mixture of n-pentane (75%) and iso-pentane (25%) are then pressurized and injected into the feeding of the additive. The mixing is completed with the use of static mixers, at a temperature of about 190° C. The composition thus obtained is described hereunder as "Composition (B)".

Composition (B) is added to 850 parts of Composition (A) coming from the heat exchanger. The ingredients are then mixed by means of static mixing elements for a calculated average residence time of 7 minutes. The composition is then distributed to the die, where it is extruded, granulated, expanded and moulded as indicated in Example 1, Part B. Test samples are taken from the block, expanded and moulded at 17 g/l, for the measurement of the thermal conductivity and fire behaviour test, completely following the procedure described in Example 1 Part B.

The test samples pass the fire behaviour test DIN 4102. The thermal conductivity proved to be 30.8 mW/mK.

Test samples are also collected for an evaluation of the compression strength according to EN ISO 844. The stress at 10% of compression proved to be 130 kPa.

A thermogravimetric analysis (TGA) is effected on a sample taken from the same blocks, in order to define the percentage of carbonaceous material present. The following procedure was adopted: a temperature rise equal to 20 degrees per minute is used, up to 600° C., in nitrogen. The weight loss is then registered. The feeding of air is initiated and the temperature is brought to 800° C. The difference in weight loss between the value registered at 600° C. in nitrogen and 800° C. in air is considered as being equal to the carbonaceous material present. The analysis is repeated three times. The content of carbonaceous material refers to the average of the values obtained from the single analyses.

The content of carbonaceous material on the test samples proved to be equal to 0.4% by weight.

Example 3

PART A—Preparation of the Concentrate Of Nano-Scaled Graphene Plates

Example 1 part A is repeated but using N,N-dimethylformamide (DMF) instead of N-methyl pyrrolidone as solvent. 100 parts of the product thus obtained are poured dropwise into a container containing 2,000 parts of methanol. The operation is effected maintaining the container under vigorous stirring. The coagulated composite powder is recovered by filtration, washed with methanol and dried at 120° C. for 12 hours.

PART B—Preparation of Expandable Polystyrene Containing Nano-Scaled Graphene Plates A mixture is charged into a closed and stirred container, consisting of 150 parts by weight of water, 0.2 parts of sodium pyrophosphate, 99 parts of styrene, 0.25 parts of tert-butylperoxy-2-ethylhexanoate, 0.25 parts of tert-butyl perbenzoate and 1 part of the preparation prepared in Part A. The mixture is heated under stirring to 90° C.

After about 2 hours at 90° C., 4 parts of a solution of polyvinylpyrrolidone at 10% are added. The mixture is heated to 100° C., still under stirring, for a further 2 hours, 7 parts of a 70/30 mixture of n-pentane and i-pentane are added, the whole mixture is heated for a further 4 hours to 125° C., it is then cooled and the batch is discharged.

The granules of expandable polymer thus produced are subsequently recovered and washed with demineralized water containing 0.05% of a non-ionic surfactant consisting of a fatty alcohol condensed with ethylene oxide and propylene oxide, sold by Huntsman under the trade-name of Empilan 2638. The granules are then dried in a stream of warm air, 0.02% of a non-ionic surfactant is added, consisting of a condensate of ethylene oxide and propylene oxide on a glycerine base, sold by Dow (Voranol CP4755) and they are subsequently screened obtaining a fraction with a diameter ranging from 1 to 1.5 mm.

0.2% of glyceryl monostearate and 0.1% of zinc stearate are then added to this fraction.

The product is expanded with vapour and moulded according to what is described in Example 1 part B. Test samples are collected for measuring the thermal conductivity according to what is specified in the same Example. The thermal conductivity was 33.2 mW/mK whereas the concentration of coal, calculated according to the same procedure indicated in Example 2 part B, proved to be 0.2% by weight.

Test samples are collected from said sheet for an evaluation of the compression strength according to EN ISO 844. The stress at 10% compression proved to be 110 kPa.

Example 4

PART A—Preparation of the Concentrate

The concentrate is prepared according to Example 3 part A. The product obtained is washed in deionized water, filtered and dried. The product is subsequently micronized by means of a jet mill.

PART B—Preparation of Expanded Polystyrene
Sheets Containing Nano-Scaled Graphene Plates A mixture consisting of 97 parts of polystyrene N1782 and 3 parts of the product prepared in Example 3 part A, are fed in continuous to a system of two extruders in series.

The temperature inside the first extruder is 220° C. so as to melt the polystyrene and mix it with the additives.

2 parts of ethyl alcohol are fed into the mixture thus obtained together with 4 parts of carbon dioxide as expanding agent per 100 parts of the mixture.

The polymeric melt comprising the expanding system is homogenized and cooled to 120° C., and then extruded through a die having a transversal, rectangular section having dimensions of 300 mm×1.5 mm.

A continuous sheet having a thickness of 120 mm is obtained. The density of the sheet is 35 g/l, the average cell size (substantially spherical) inside the sheet is about 400 μm. The thermal conductivity proved to be 34 mW/mK.

Test samples are obtained from said sheet to evaluate the compression strength according to EN ISO 844. The stress at 10% compression proved to be 550 kPa.

Example 5

Comparative

Preparation of Expanded Polystyrene Sheets Not Containing Nano-Scaled Graphene Plates.

100 parts of polystyrene N1782 are fed in continuous to a system of two extruders in series.

The temperature inside the first extruder is 220° C. so as to melt the polystyrene.

2 parts of ethyl alcohol are fed to the polystyrene together with 4 parts of carbon dioxide as expanding agent, per 100 parts of the mixture (A).

The polymeric melt, comprising the expansion system, is homogenized and cooled to 120° C., and subsequently extruded through a die having a transversal rectangular section with dimensions of 300 mm×1.5 mm.

A continuous sheet having a thickness of 120 mm, is obtained. The density of the sheet is 35 g/l, the average cell size (substantially spherical) inside the sheet is about 500 μm.

Test samples are obtained from said sheet in order to evaluate the compression strength according to EN ISO 844. The stress at 10% compression proved to be 420 kPa.

Example 6

Preparation of Expandable Polystyrene Containing Nano-Scaled Graphene Plates 0.4 parts of sodium dodecylbenzene sulfonate are dispersed in 1,000 parts of deionized water by stirring with a magnetic anchor.

5 parts of graphite "UF1 98.5", produced by Kropfmuhl, are then added to the solution, maintaining it under constant stirring. An ultrasonic field is applied, still under continuous stirring, by means of a sonotrode calibrated at 20 kHz, with a specific power, calculated on the basis of the power absorbed by the generator, equal to about 100 W/liter. After about 2 hours, the product thus obtained is subjected to centrifugation.

150 parts of the supernatant are collected and charged into a stirred and closed container. 0.2 parts of sodium pyrophosphate, 100 parts of styrene, 0.25 parts of tert-butyl peroxy-2-ethylhexanoate, 0.25 parts of tert-butylperbenzoate, are then added.

The mixture thus obtained is subjected to the same steps and process conditions as described in example 3. The granules are expanded and moulded under the same conditions.

The conductivity measured at 17 g/l was 31.7 mW/mK. The carbon content was equal to 0.2% by weight and the stress at 10% compression was 120 kPa.

Example 7

PART A—Preparation of the Concentrate 68 parts of polystyrene N1782, produced by Polimeri Europa, are mixed in a twin-screw extruder; 2 parts of ethylene-bis-stereamide are added together with 30 parts of the composition obtained in Example 3 part A. The extruded product is used as masterbatch.

PART B—Preparation of Expandable Polystyrene Containing Nano-Scaled Graphene Plates 89.8 parts of ethylbenzene, 730.0 parts of styrene, 56.4 parts of α-methyl-styrene are fed into a stirred reactor.

123.8 parts of the masterbatch prepared as above, are fed into the reactor and dissolved (total: 1,000 parts). The reaction is carried out at 125° C. with an average residence time of 2 hours. The fluid composition at the outlet is fed to a second reactor where the reaction is completed at 135° C. with an average residence time of 2 hours.

The resulting composition, hereafter referred to as "Composition (A)", having a conversion of 72%, is heated to 240° C. and subsequently fed to the devolatilizer to remove the solvent and residual monomer. The same is characterized by a molecular weight Mw of 200,000 g/mol and a Mw/Mn ratio of 2.8, wherein Mw is the weight average molecular weight and Mn is the number average molecular weight.

Composition (A) is fed from the devolatilizer to a heat exchanger to reduce its temperature to 170° C.

130.7 parts of polystyrene N2982 produced by Polimeri Europa, 14.2 parts of stabilized EBCD (Saytex HP900SG, sold by Chemtura) and 5.1 parts of Perkadox 30® (2,3-dimethyl-2,3-diphenylbutane, sold by Akzo Nobel), for a total of 150 parts, are fed into a second twin-screw extruder.

A gear pump increases the feeding pressure of this molten additive to 260 barg. 47 parts of a mixture of n-pentane (75%) and iso-pentane (25%) are then pressurized and injected into the feeding of the additive. The mixing is completed by static mixers, at a temperature of about 190° C. The composition thus obtained is described hereafter as "Composition (B)".

Composition (B) is added to 850 parts of Composition (A) coming from the heat exchanger. The ingredients are then mixed by static mixing elements for an average residence time of 7 minutes.

The composition is then distributed to the die where it is extruded, granulated, expanded and moulded as indicated in Example 1 Part B. Test samples are collected from the block, expanded and moulded at 17 g/l, for the measurement of the thermal conductivity and fire behaviour test, again following what is indicated in Example 1 Part B.

The test samples pass the fire behaviour test DIN 4102. The thermal conductivity proved to be 29.8 mW/mK.

The thermogravimetric analysis (TGA) and compression strength, measured according to what is indicated in Example 2 part B, respectively show a carbon content equal to 0.7% by weight and a stress at 10% compression equal to 140 kPa.

Example 8

PART A—Preparation of the Concentrate

The dispersion of the nano-scaled graphene plates in polystyrene is effected following Example 3 of WO 2008/048295. The TGA analysis for the carbon content, effected as described in Example 1 Part B of the present invention, proved to be equal to 2.5% by weight.

PART B—Preparation of Expandable Polystyrene Containing Nano-Scaled Graphene Plates 945 parts of polystyrene N1782, 40 parts of the dispersion prepared in Part A, 2 parts of Perkadox 30 and 13 parts of stabilized EBCD Saytex HP900SG, sold by Albemarle (total: 1,000 parts) are fed into a twin-screw extruder.

The mixture thus obtained is subjected to a pressure of 250 bar by means of a gear pump.

100 parts of the melted composition thus obtained are mixed with 5 parts of a mixture of n-pentane (75%) and iso-pentane (25%), injected into the molten mixture by means of a high pressure membrane pump.

The resulting product is brought to a temperature of 160° C. It is then granulated, dried and covered with a coating, as in the conditions mentioned in Example 1 part B. The granules thus obtained are then expanded and moulded to form a block, again following the procedure of Example 1 part B.

Test samples are collected for the measurement of the fire behaviour test and thermal conductivity, again following the procedure of Example 1 part B. The thermal conductivity proved to be 32.7 mW/mK at 17 g/l. The test samples pass the fire behaviour test.

Test samples are collected from the same block for the evaluation of the compression strength, following Example 5 (comparative). The stress at 10% compression proved to be equal to 115 kPa.

Example 9

Comparative

PART A—Preparation of the Concentrate 975 parts of polystyrene N1782, and 25 parts of graphite UF2-96/97 produced by Kropfmuhl are fed into a twin-screw extruder. The product is then mixed and extruded, and subsequently granulated.

PART B—Preparation of Expandable Polystyrene Containing Graphite

Example 8 part B is repeated, but using the granule produced in part A of Example 9 instead of 40 parts of the dispersion of nano-scaled graphene plates.

The conductivity on the resulting test samples, at 17 g/l, proved to be equal to 34.2 mW/mK, whereas the stress at 10% compression proved to be equal to 95 kPa.

Example 10

PART A—Preparation of the Concentrate

The nano-scaled graphene plates are obtained starting from graphite oxide according to Example 2 of WO 2008/045778.

900 parts of polystyrene EDISTIR N1782 (polystyrene having a Mw of 180,000 g/mol, Mw/Mn=2.3, MFI (200° C., 5 kg) equal to 7.5 g/10', produced by Polimeri Europa) are micronized in a mill.

100 parts of nano-scaled graphene plates are mixed for 30 seconds at 2,000 rpm in a high shear powder mixer (mixer Plasmec TRL 10) together with 900 parts of micronized polystyrene.

The mixture thus obtained is fed to a twin-screw extruder where it is melted and mixed. The polymeric melt is granulated by the cutting into spaghetti. A degassing section is present in the extruder, where the volatile components are removed by vacuum suction.

Part B—Preparation of Expandable Polystyrene Containing Nano-Scaled Graphene Plates Example 8 part B is repeated but substituting the 40 parts of the nano-scaled graphene plates of Example 8 part A, with a mixture of 6 parts of the granules obtained in Part A of Example 10 and 34 parts of polystyrene in granules N1782.

The material obtained is expanded and moulded, again following the procedure indicated, obtaining a density of 17 g/l. An aliquot of the beads, after expansion, is left to age for 24 hrs and is then expanded again using the same procedure. The material obtained, after a further aging of 24 hrs, is moulded forming blocks having a density of 12.5 g/l.

The TGA, again effected according to Example 2 part B, indicated a carbon content equal to 0.6% by weight.

The conductivity proved to be 30.2 mW/mK at 12.5 g/l. The test samples passed the fire behaviour test.

Test samples were obtained from the same block for an evaluation of the compression strength, following Example 5 (comparative). The stress at 10% compression proved to be equal to 85 kPa.

Example 11

Comparative

Example 9 (comparative) is repeated but substituting 25 parts of graphite with an equal amount of polystyrene N1782.

The beads thus obtained are expanded and moulded following Example 10, obtaining blocks at 12.5 g/l.

The conductivity proved to be 38 mW/mK at 12.5 g/l.

The compression strength is evaluated following example 5 (comparative). The stress at 10% compression proved to be equal to 60 kPa.

Example 12

PART A—Preparation of the Concentrate

A concentrate of nano-scaled graphene plates is prepared on the basis of the disclosures contained in patent application WO 2009/029984. 20 g of sodium metal are reacted at 220° for 72 hrs in 50 ml of EtOH (molar ratio 1:1). The reaction generates a graphene precursor (a solvothermal product, such as, for example, a metal alkoxide). Said precursor is pyrolized in a Lindberg tube furnace in an atmosphere of argon. The furnace is preheated to 1100°. A quartz tube containing the precursor under an argon atmosphere is rapidly inserted into the furnace and extracted after a minute. The product thus obtained is subsequently washed in deionized water, filtered and dried, and is then micronized by means of a jet mill. Nano-scaled graphene plates are thus obtained.

The sample is analyzed by TGA, again following the procedure indicated in Example 2 part B. The measurement indicated a carbon content equal to 80% by weight.

The particle diameter is evaluated by means of a laser diffraction granulometer. The average particle diameter proved to be 5 μm.

PART B—Preparation of Expandable Polystyrene Containing Nano-Scaled Graphene Plates 89.8 parts of ethylbenzene, 853.8 parts of styrene, 56.4 parts of α-methylstyrene (total: 1,000 parts) are fed to a stirred reactor. The reaction is carried out at 125° C. with an average residence time of 2 hrs. The fluid composition at the outlet is then fed to a second reactor where the reaction is completed at 135° C. with an average residence time of 2 hrs.

The resulting composition, hereafter referred to as "Composition (A)", having a conversion of 72%, is heated to 240° C. and subsequently fed to the devolatilizer to remove the solvent and the residual monomer. The same is characterized by a melt flow index (MFI) at 200° C., 5 kg, of 8 g/10', a molecular weight Mw of 200,000 g/mol and a Mw/Mn ratio of 2.8, wherein Mw is the weight average molecular weight and Mn is the number average molecular weight.

Composition (A) is fed from the devolatilizer to a heat exchanger to reduce its temperature to 170° C.

123.7 parts of polystyrene N2982 produced by Polimeri Europa, 10.0 parts of the sample obtained in Part A of the present example, 14.2 parts of stabilized EBCD (Saytex HP900SG, sold by Chemtura) and 2.1 parts of Perkadox 30° (2,3-dimethyl-2,3-diphenylbutane, sold by Akzo Nobel), for a total of 150 parts, are fed into a second twin-screw extruder.

A gear pump increases the feeding pressure of this molten additive to 260 barg. The composition thus obtained is described hereafter as "Composition (B)".

Composition (B) is added to 850 parts of Composition (A) coming from the heat exchanger and to parts of a mixture of n-pentane (75%) and iso-pentane (25%). The mixing is completed by means of static mixers, at a temperature of about 190° C.

The ingredients are then mixed and granulated as described in Example 2.

The expansion of the granules and moulding were effected as in Example 10. The TGA analysis effected as in Example 1 part B of the present invention, proved to be equal to 0.8% by weight. The thermal conductivity proved to be 30.6 mW/mK at 12.5 g/l.

Example 13

PART A—Preparation of the Concentrate

Nano-scaled graphene plates are produced following Example 2 of patent application US 2008/0206124.

The product thus obtained is washed in deionized water, filtered and dried. The product is then micronized by means of a jet mill. Nano-scaled graphene plates are thus obtained.

The sample is analyzed by TGA, again following the procedure indicated in Example 2 part B. The measurement indicated a carbon content equal to 90% by weight.

The particle diameter is evaluated by means of a laser diffraction granulometer. The average size proved to be 6 μm.

PART B—Preparation of Expandable Polystyrene Containing Nano-Scaled Graphene Plates Example 12 part B is repeated but substituting the 10 parts of nano-scaled graphene plates obtained according to Example 12 part A with those obtained in part A of the present example.

The TGA analysis effected according to Example 1 part B, proved to be equal to 0.9% by weight.

The thermal conductivity proved to be 30.8 mW/mK at 12.5 g/l.

Example 14

PART A—Preparation of the Concentrate 70 parts of linear low density polyethylene of the type Flexirene FG 30, produced by Polimeri Europa (density 0.925 g/l, MFI 190°, 2.16 kg equal to 1.0 g/10') and 30 parts of the composition obtained in Example 3, part A, are mixed in a twin-screw extruder. The extruded product is used as masterbatch.

PART B—Preparation of Expanded Polyethylene Sheets Containing Nano-Scaled Graphene Plates A mixture consisting of 80 parts of linear low density polyethylene of the type Flexirene FG 30 and 20 parts of the masterbatch prepared in part A of the present example, are fed in continuous to a system of two extruders in series.

The temperature inside the first extruder is 220° C. so as to melt the polyethylene and mix it with the additives.

2 parts of ethyl alcohol are fed to the mixture thus obtained, together with 4 parts of carbon dioxide as expanding agent per 100 parts of the mixture.

The polymeric melt comprising the expansion system is homogenized and cooled to 130° C., and then extruded through a die having a transversal rectangular section with dimensions of 200 mm×1.5 mm.

A continuous sheet is obtained having a thickness of 90 mm. The sheet density is 50 g/l, the average cell dimension (substantially spherical) inside the sheet is about 400 μm.

Test samples are obtained from this sheet to evaluate the compression strength according to EN ISO 844. The stress at 10% compression proved to be 250 kPa.

Example 15

PART A—Preparation of the Masterbatch

The nano-scaled graphene plates are prepared according to Example 1 of patent application US 2009/0155578. The second reintercalation step is not effected.

900 parts of polystyrene of the type EDISTIR N1782 (polystyrene having a Mw equal to 180,000 g/mol, Mw/Mn=2.3, MFI (200° C., 5 kg) equal to 7.5 g/10', produced by Polimeri Europa) are micronized in a grinding mill.

100 parts of the above nano-scaled graphene plates are mixed for 30 seconds at 2,000 rpm in a high shear powder mixer (Plasmec TRL 10 mixer) with 900 parts of micronized polystyrene.

The mixture thus obtained is fed to a twin-screw extruder, where it is melted and mixed. The polymeric melt is granulated by the cutting into spaghetti. A degassing section is present in the extruder, where the volatile components are removed by means of vacuum suction.

PART B—Preparation of Expandable Polystyrene Containing Nano-Scaled Graphene Plates 61 parts of polystyrene N 1782 produced by Polimeri Europa, 2 parts of etyhelene-bis-stereamide; 20 parts of Saytex HP 900 (hexabromocyclododecane sold by Alberarle) 5 parts of Perkadox 30 (2,3-dimethyl-2,3-diphenyl butane, sold by Akzo Nobel) and 12 parts of the masterbatch produced in part A of this example, are mixed in a twin-screw extruder.

50 parts of a mixture of n-pentane (75%) and iso-pentane (25%) are added to the polymeric melt at the outlet of the single-screw extruder. The mixture thus obtained is mixed by means of a series of static mixing elements. A gear pump increases the pressure of the mixture thus obtained to 200 barg. The mixture is then cooled to about 170° C. by means of a mixing exchanger (SMR).

The composition is then distributed to the die, granulated, expanded and moulded according to what is indicated in Example 1 part B.

Blocks are obtained at 17 g/l in a first expansion and at 12.5 g/l in a second expansion as indicated in Example 10 part B.

The analysis of the coal content through TGA analysis, effected as indicated in Example 1, part B, proved to be equal to 1.2% by weight. The thermal conductivity proved to be 29.5 mW/mK at 12.5 g/l. The stress at 10% compression, effected as indicated in Example 2 part B, proved to be 160 kPa at 17 g/l.

Example 16

PART A—Preparation of the Masterbatch

The nano-scaled graphene plates are prepared according to Example 1 of patent application US 2009/0155578. The second reintercalation step is effected as indicated in the cited example.

980 parts of polystyrene of the type EDISTIR N1782 (polystyrene having a Mw equal to 180,000 g/mol, Mw/Mn=2.3, MFI (200° C., 5 kg) equal to 7.5 g/10', produced by Polimeri Europa) are micronized in a grinding mill.

20 parts of the above nano-scaled graphene plates are mixed for 30 seconds at 2,000 rpm in a high shear powder mixer (Plasmec TRL 10 mixer) with 900 parts of micronized polystyrene.

The above powder mixture is extruded and granulated following the same procedure indicated in Example 15 part A.

PART B—Preparation of Expandable Polystyrene Containing Nano-Scaled Graphene Plates Example 15 part B is repeated, but using the masterbatch of the nano-scaled graphene plates as obtained in part A of the present example.

Blocks at 12.5 g/l are prepared, proceeding with a second expansion as indicated in Example 10, part B.

The analysis of the coal content through TGA analysis, effected as indicated in Example 1, part B, of the present invention, proved to be equal to 0.2%. The thermal conductivity proved to be 31.9 mW/mK at 12.5 g/1. The stress at 10% compression, effected as indicated in Example 2 part B, proved to be 80 kPa.

Example 17

PART A—Preparation of the Masterbatch

Example 16, part A is repeated but using an equal amount of nano-scaled graphene plates prepared according to Example 4 of patent application US 2009/0155578.

PART B—Preparation of Expandable Polystyrene Containing Nano-Scaled Graphene Plates Example 15 part B is repeated, but using the masterbatch of the nano-scaled graphene plates as obtained in part A of the present example.

Blocks at 12.5 g/l are prepared, proceeding with a second expansion as indicated in Example 10, part B.

The thermal conductivity proved to be 32.0 mW/mK at 12.5 g/l.

Example 18

PART A—Preparation of the Masterbatch

Example 16, part A is repeated but using an equal amount of nano-scaled graphene plates prepared according to Example 2 of patent application US 2009/0026086.

PART B—Preparation of Expandable Polystyrene Containing Nano-Scaled Graphene Plates Example 15 part B is repeated, but using the masterbatch of the nano-scaled graphene plates as obtained in part A of the present example.

Blocks at 12.5 g/l are prepared, proceeding with a second expansion as indicated in Example 10, part B.

The thermal conductivity proved to be 32.1 mW/mK at 12.5 g/l. The stress at 10% compression, effected as indicated in Example 2 part B, proved to be 75 kPa.

Example 19

PART A—Preparation of the Concentrate of Nano-Scaled Graphene Plates

Graphite powder of the type UF2-96/97 produced by Kropfmuhl is inserted into a tube of aluminium oxide.

The tube is inserted in a refrigerator to maintain a temperature of −18° C.

A series of ozone generators are used, of the Microlab type, produced by the company Biaccabi, fed by an oxygen cylinder. The ozone thus produced is cooled to −18° C. and then flushed through the graphite for 24 hrs.

97.5 parts of polystyrene are dissolved in N,N-dimethylformamide. 2.5 parts of the graphite functionalized with oxygen groups (FOG) are collected from the aluminium oxide tube and dispersed in the solution with the aid of an ultrasound sonotrode immersed in the solution. The latter is heated to 90° C., dimethylhydrazine is then added and left to act for 24 hrs. The solution is fed dropwise to a container filled with methanol and kept under vigorous stirring. The compound, separated by centrifugation, is washed, dried and a pestle is used to reduce it to powder form.

PART B—Preparation of Expandable Polystyrene Containing Nano-Scaled Graphene Plates Example 15 part B is repeated but using the masterbatch of nano-scaled graphene plates as obtained in part A of the present example. Blocks are produced at 17 g/l.

The carbon content, measured as indicated in Example 2, proved to be equal to 0.2% by weight.

The thermal conductivity proved to be 31.7 mW/mK at g/l. The stress at 10% compression, effected as indicated in Example 2 part B, proved to be 110 kPa.

Example 20

PART A1—Preparation of the Nano-Scaled Graphene Plates

Graphite powder of the type UF2-96/97 produced by Kropfmuhl is inserted into a tube of aluminium oxide.

A series of ozone generators are used, of the Microlab type, produced by the company Biaccabi, this time fed by dried air. The ozone thus produced is mixed with a stream of overheated water vapour. The mixture thus obtained is then flushed through the graphite for 12 hrs.

The aluminium oxide tube containing the functionalized graphite (FOG) is flushed for a few minutes in argon, then rapidly inserted in a Lindberg tube furnace, still maintained under an argon atmosphere. The furnace is pre-heated to 1,100° C. After 30 seconds, the tube is extracted from the furnace and left to cool still under an argon flux.

PART A2—Preparation of the Concentrate Of Nano-Scaled Graphene Plates 980 parts of polystyrene EDISTIR N1782 (polystyrene with a Mw equal to 180,000 g/mol, Mw/Mn=2.3, MFI (200° C., 5 kg) equal to 7.5 g/10', produced by Polimeri Europa) are micronized in a grinding mill.

20 parts of the above nano-scaled graphene plates are mixed for 30 seconds at 2,000 rpm in a high shear powder mixer (Plasmec mixer TRL 10) together with the 900 parts of micronized polystyrene.

The above powder mixture is extruded and granulated following the same procedure as Example 15 part A.

PART B—Preparation of Expandable Polystyrene Containing Nano-Scaled Graphene Plates Example 15 part B is repeated but using the masterbatch of nano-scaled graphene plates as obtained in part A2 of the present example. Blocks are produced at 17 g/l.

The carbon content, measured as indicated in Example 2, proved to be equal to 0.2% by weight.

The thermal conductivity proved to be 31.5 mW/mK at g/l. The stress at 10% compression, effected as indicated in Example 2 part B, proved to be 110 kPa.

Example 21

PART A1—Preparation of the Nano-Scaled Graphene Plates

Graphite powder UF2-96/97 produced by Kropfmuhl is inserted in a tube of aluminium oxide.

The tube is introduced into a muffle furnace under an atmosphere of nitrogen pre-heated to 550° C. A mixture of 10 parts of air, 40 parts of nitrogen and 50 parts of water vapour is heated by passing it in a coiled tube situated inside said muffle furnace and is then fed to the tube containing the graphite. After 4 hrs at 550° C. the muffle is extinguished still maintaining the flushing. The graphite functionalized with oxygen groups (FOG) is fed to a Lindberg tube furnace as indicated in part A1 of Example 20.

PART A2—Preparation of the Concentrate Of Nano-Scaled Graphene Plates

The masterbatch is prepared using the same procedure indicated in part A2 of Example 20, but using the nano-scaled plates produced in part A1 of the present example.

PART B—Preparation of Expandable Polystyrene Containing Nano-Scaled Graphene Plates Example 15 part B is repeated but using the masterbatch of nano-scaled graphene plates as obtained in part A2 of the present example. Blocks are produced at 17 g/l.

The carbon content, measured as indicated in Example 2, proved to be equal to 0.2% by weight.

The thermal conductivity proved to be 32.0 mW/mK at g/l. The stress at 10% compression, effected as indicated in Example 2 part B, proved to be 105 kPa.

Example 22

Preparation of Expandable Polystyrene Containing Nano-Scaled Graphene Plates

Graphite powder UF2-96/97 produced by Kropfmuhl is oxidized following the Hummers method. A part of the product thus obtained is dispersed in 100 parts of water deionized by sonication.

The product thus obtained is charged into a closed, stirred container. A mixture of 50 parts by weight of water, 0.2 parts of sodium pyrophosphate, 100 parts of styrene, 0.25 parts of tert-butylperoxide-2-ethylhexanoate, 0.25 parts of tert-butylperbenzoate is added. 20 parts of a solution at 10% of hydrazine are added under stirring and the mixture is heated to 90° C.

After about 2 hrs at 90° C., 4 parts of a solution at 10% of polyvinylpyrrolidone are added. The mixture is heated, still under stirring to 100° C. for a further 2 hrs, 7 parts of a 70/30 mixture of n-pentane and i-pentane are added, the mixture is heated for a further 4 hrs to 125° C., and is then cooled and the batch is discharged.

The expandable polymer granules thus produced are subsequently treated with the same procedure indicated in Example 3 part B.

The product is expanded with vapour and moulded according to what is indicated in Example 10 of part B. The thermal conductivity was 30.2 mW/mK at 12.5 g/l whereas the carbon concentration, calculated following the same procedure indicated in Example 2 part B, proved to be equal to 0.8% by weight.

Test samples are prepared at 17 g/l to evaluate the compression strength according to EN ISO 844. The stress at 10% compression proved to be equal to 130 kPa.

Example 23

PART A—Preparation of the Concentrate of Nano-Scaled Graphene Plates

The nano-scaled graphene plates are prepared according to Example 2 of patent application US 2009/0026086.

10 parts of the nano-scaled plates thus produced are dispersed in 200 parts of tetrahydrofuran (THF) by sonication effected with an ultrasound sonotrode immersed in the solution.

300 parts of polystyrene of the type N1782 produced by Polimeri Europa are dissolved in a stirred tank containing 3,000 parts of tetrahydrofuran. The solution of nano-scaled graphene plates is then poured into the solution of polystyrene, under continuous stirring, and the solution thus obtained is left under stirring for 4 hours. Overheated vapour is insufflated into the solution, evaporating the THF. The concentrate thus obtained is dried in a muffle furnace under vacuum PART B—Preparation of Expandable Polystyrene Containing Nano-Scaled Graphene Plates Example 15 part B is repeated but using the concentrate of nano-scaled graphene plates as obtained in part A of the present example. Blocks are produced at 12.5 g/l. The carbon content, measured as indicated in Example 2, proved to be equal to 0.4%.

The thermal conductivity proved to be 30.0 mW/mK at 12.5 g/l. The stress at 10% compression, effected as indicated in Example 2 part B, proved to be 120 kPa.

Example 24

Preparation of Expandable Polystyrene Containing Nano-Scaled Graphene Plates

Example 15 parte A is repeated. 150 parts of polystyrene N 1782 produced by Polimeri Europa, 20 parts of etyhelene-bis-stereamide; 25 parts of Saytex HP 900 (hexabromocyclododecane sold by Alberarle); 5 parts of Perkadox 30 (2,3-dimethyl-2,3-diphenyl butane, sold by Akzo Nobel) and 800 parts of the masterbatch produced in part A of this example, are mixed in a twin-screw extruder.

50 parts of a mixture of n-pentane (75%) and iso-pentane (25%) are added to the polymeric melt at the outlet of the single-screw extruder. The mixture thus obtained is mixed by means of a series of static mixing elements. A gear pump increases the pressure of the mixture thus obtained to 200 barg. The mixture is then cooled to about 170° C. by means of a mixing exchanger (SMR).

The composition is then distributed to the die, granulated, expanded and moulded according to what is indicated in Example 1 part B.

Blocks are obtained at 20 g/l in a first expansion and at 12.5 g/l in a second expansion as indicated in Example 10 part B.

The analysis of the carbon content through TGA analysis, effected as indicated in Example 1, part B of the present invention, proved to be equal to 2.6% by weight. The thermal conductivity proved to be 30.8 mW/mK at 12.5 g/l. The stress at 10% compression, effected as indicated in Example 2 part B, proved to be 210 kPa at 20 g/l.

The measurement of the electric conductivity was effected on the end-product at 20 g/l using the four-point method. The conductivity proved to be equal to 0.0001 Siemens cm2.

Example 25

PART A—Preparation of the Concentrate of Nano-Scaled Graphene Plates

A polystyrene-TEMPO was produced according to the methods indicated in literature (Georges et al, Macromolecules, 26, 5316 (1993) and Hawkar et al, Macromolecules, 28, 2993 (1995)) using Styrene and m-Xylene (Polimeri Europa), TEMPO (2,2,6,6-tetramethyl-1-piperidinyloxy) supplied by Aldrich Chemical Co., Di-benzoyl peroxide (AKZO NOBEL).

The nano-scaled graphene plates are prepared according to Example 2 of patent application US 2009/0026086.

100 parts of said nano-scaled graphene plates, 1,000 parts of polystyrene-TEMPO and 5,000 parts of m-xylene are mixed in a tank.

The mixture is brought to 125° C. and maintained under constant stirring. After 8 hours the reagent mixture is poured dropwise into a second container containing an excess of methanol maintained under vigorous stirring. The precipitate is filtered on filter paper, washed with methanol and dried in an oven at 80° C. in a stream of nitrogen for 24 hours.

PART B—Preparation of Expandable Polystyrene Containing Nano-Scaled Graphene Plates Example 15 part B is repeated but using the concentrate of nano-scaled graphene plates as obtained in part A of the present example. Blocks are produced at 12.5 g/l. The carbon content, measured as indicated in Example 2, proved to be equal to 1.2% by weight.

The thermal conductivity proved to be 29.6 mW/mK at 12.5 g/l. The stress at 10% compression, effected as indicated in Example 2 part B, proved to be 140 kPa at 17 g/l.

In all of the present document, the term "part" implicitly refers to "part by weight", unless otherwise specified. The same applies to the percentage values.

The examples should be considered as being illustrative but non-limiting of the object of the present invention.

The invention has been described in detail with particular reference to preferred embodiments of the same, but it is understood that variations and modifications can be effected in the spirit and within the scope of the invention. While it is evident that the example embodiments of the present invention described herein satisfy the objectives specified above, it is understood that numerous modifications and other embodiments can be conceived by experts in the field.

It is therefore understood that the specific claims cover all of these modifications and embodiments, which form part of the spirit and object of the present invention.

All the conditions indicated in the description should be considered as being preferred conditions even if not expressly specified.

The invention claimed is:

1. A nanocomposite composition which comprises an expandable thermoplastic polymer, said polymer comprising:
   a) a polymeric matrix produced by polymerization of a base comprising one or more polymerizable monomers,
   b) 1-10% by weight, calculated with respect to the polymer matrix, of an expanding agent embedded in the polymer matrix, and
   c) 0.004-15% by weight, calculated with respect to the polymer matrix, of an athermanous filler comprising nano-scaled graphene plates with a thickness (orthogonal to the graphene sheet) not greater than 150 nm, an average dimension (length, width, or diameter) not greater than 10 micrometers and a surface area>50 m$^2$/g.

2. The nanocomposite composition according to claim 1, wherein the polymerizable monomers are selected from vinyl monomers and vinyl aromatic monomers.

3. The nanocomposite composition according to claim 2, wherein the polymerizable monomers are selected from vinyl aromatic monomers.

4. The nanocomposite composition according to claim 1, wherein the athermanous filler further comprises up to 6% of an additive selected from the group consisting of graphite, carbon coke, carbon black, and combinations thereof.

5. The nanocomposite composition according to claim 1, wherein the thickness (orthogonal to the graphene sheet) of the nano-scaled graphene plates is less than 50 nm.

6. The nanocomposite composition according to claim 1, wherein the thickness (orthogonal to the graphene sheet) of the nano-scaled graphene plates is from 0.3 to 5 nm.

7. The nanocomposite composition according to claim 1, wherein the average dimension (length, width, or diameter) of the nano-scaled graphene plates is not greater than 1 micrometer.

8. The nanocomposite composition according to claim 1, wherein the average dimension (length, width, or diameter) of the nano-scaled graphene plates is not greater than 500 nm.

9. The nanocomposite composition according to claim 1, wherein the surface area of the nano-scaled graphene plates is from 100 to 2,600 m$^2$/g.

10. The nanocomposite composition according to claim 1, wherein the surface area of the nano-scaled graphene plates is from 300 to 2,600 m$^2$/g.

11. An expanded article comprising the nanocomposite composition according to claim 1, having a density of from 5 to 50 g/l and a thermal conductivity of from 25 to 50 mW/mK.

12. An expanded extruded sheet comprising thermoplastic polymers which comprise a cellular matrix having a density of from 10 to 200 g/l, an average cell dimension of from 0.01 to 1.00 mm and comprising from 0.004 to 15% by weight, calculated with respect to the thermoplastic polymer, of an athermanous filler which comprises nano-scaled graphene plates with a thickness (orthogonal to the graphene sheet) not greater than 150 nm, an average dimension (length, width, or diameter) not greater than 10 micrometers and a surface area>50 m$^2$/g.

13. The extruded sheet according to claim 12, wherein the thermoplastic polymer is selected from a vinyl polymer and a vinyl aromatic polymer.

14. The extruded sheet according to claim 13, wherein the thermoplastic polymer is a vinyl aromatic polymer.

15. The extruded sheet according to claim 12, wherein said athermanous filler further comprises up to 6% by weight with respect to the polymer, an additive selected from the group consisting of graphite, carbon coke, carbon black, and combinations thereof.

16. A method for preparing the nanocomposite composition according to claim 1 in bead or granule form, the process comprising: polymerizing in aqueous suspension one or more vinyl aromatic monomers, optionally together with at least one polymerizable comonomer in a quantity of up to 50% by weight, in the presence of said athermanous filler optionally with further additives, and in the presence of a peroxide radical initiator system; adding an expanding agent before, during, or after polymerization, thereby producing the expandable thermoplastic polymer; and granulating the expandable thermoplastic polymer into beads or granules.

17. The method according to claim 16, wherein the athermanous filler further comprises up to 6% by weight with respect to the polymer, an additive selected from the group consisting of graphite, carbon coke, carbon black, and combinations thereof.

18. The method according to claim 16, wherein the viscosity of a solution of vinyl aromatic monomers suspended in water is increased by dissolving vinyl aromatic polymer, in said solution, up to a concentration of from 1 to 30% by weight, with respect to the weight of the monomers.

19. The method according to claim 16, wherein the viscosity of a solution of vinyl aromatic monomers suspended in water is increased by pre-polymerizing in mass the monomer, or mixture of monomers, until a concentration of polymer of from 1 to 30% by weighted is obtained.

20. The method according to claim 16, wherein the beads or granules are substantially spherical and have an average diameter of from 0.2 to 2 mm, and in which said athermanous filler and said optional additives are homogenously dispersed, wherein the optional additives are selected from the group consisting of graphite, carbon coke, carbon black, and combinations thereof.

21. A method for preparing the nanocomposite composition according to claim 1 in bead or granule form, the process comprising:
  i. mixing a thermoplastic polymer in granules, pellet, or powder form or in a molten state, the thermoplastic polymer having an average molecular weight (MW) of from 50,000 to 300,000, with said athermanous filler with the totality or a part of optional additives;
  ii. if not already in the molten state, bringing the polymeric mixture to a temperature higher than the melting point of the thermoplastic polymer;
  iii. incorporating in the molten polymer said expanding agent and any remaining portion or the totality of said optional additives;
  iv. mixing the polymeric composition obtained in iii. by static or dynamic mixing elements; and
  v. granulating the composition of iv. in a device which comprises a die, a cutting chamber, and a cutting system.

22. The method according to claim 21, wherein the athermanous filler further comprises, up to 6% by weight with respect to the polymer, an additive selected from the group consisting of graphite, carbon coke, carbon black, and combinations thereof.

23. The method according to claim 21, wherein the beads or granules are substantially spherical and have an average diameter of from 0.2 to 2 mm, and in which said athermanous filler and said optional additives are homogenously dispersed.

24. The method according to claim 21, wherein the thermoplastic polymer is a vinyl aromatic polymer in the molten state continuously coming from a solution polymerization plant.

25. The method according to claim 17, wherein said additives are incorporated in a master-batch comprising a thermoplastic polymer having an average molecular weight MW of from 50,000 to 300,000.

26. The method according to claim 25, wherein the athermanous filler, comprising said nano-scaled graphene plates and optional additives, comprises from 15 to 60% by weight of the total nanocomposite composition.

27. The method according to claim 16, wherein the athermanous filler is in the form of a master-batch, the master-batch consisting of (A) pellets of a second thermoplastic polymer which is compatible with the polymer matrix and (B) 15 to 60% by weight of the athermanous filler, and wherein the master-batch is dissolved in the one or more vinyl aromatic monomers with optional comonomers.

28. The method according to claim 21, wherein the athermanous filler is in the form of a master-batch, the master-batch consisting of (A) pellets of a second thermoplastic polymer which is compatible with the polymer matrix and (B) 15 to 60% by weight of the athermanous filler, and wherein the master-batch is mixed with the thermoplastic polymer in granules, pellets, or powder form of step i. or mixed with the thermoplastic polymer in the molten state of step i.

29. A method for the production of the expanded extruded sheet of thermoplastic polymers according to claim 12, which comprises:
  a1. mixing a thermoplastic polymer in pellets or granules or beads and said athermanous filler;
  b1. heating the mixture (a1) to a temperature of from 180 to 250° C. so as to obtain a molten polymer;
  b2. homogenizing the molten polymer of b1;
  c1. adding to the homogenized polymeric melt (b2), at least one expanding agent and optionally further additives;
  d1. homogenizing the polymeric melt of c1;
  e1. homogeneously cooling the polymeric melt (d1) to a temperature not higher than 200° C. and not lower than the Tg of the resulting polymeric composition; and
  f1. extruding the cooled polymeric melt (e1) through a die thereby producing the expanded extruded sheet.

30. The method according to claim 29, wherein the thermoplastic polymer is selected from a vinyl or vinyl aromatic polymer.

31. The method according to claim 30, wherein the vinyl polymer is polyethylene and the vinyl aromatic polymer is polystyrene.

32. The method according to claim 29, wherein said athermanous filler further comprises up to 6% by weight with respect to the polymer, an additive selected from the group consisting of graphite, carbon coke, carbon black, and combinations thereof.

33. The method according to claim 29, wherein said athermanous filler is used as a master-batch.

34. An expanded extruded sheet comprising the nanocomposite composition of claim 1.

35. The method according to claim 29 wherein the optional additives in c1 are selected from the group consisting of a pigment, a stabilizing agent, a nucleating agent, a flame-retardant system, an antistatic agent, a release agent, graphite, carbon coke, carbon black and combinations thereof.

36. The method according to claim 29, wherein the optional additive in c1 is a flame-retardant system.

* * * * *